(12) United States Patent
Wang et al.

(10) Patent No.: US 12,393,390 B2
(45) Date of Patent: Aug. 19, 2025

(54) DEVICE CONTROL METHOD AND TERMINAL DEVICE

(71) Applicant: Huawei Technologies Co., Ltd., Shenzhen (CN)

(72) Inventors: Bo Wang, Wuhan (CN); Decai Huang, Wuhan (CN); Pei Zhu, Wuhan (CN); Guangjun Chen, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/258,893

(22) PCT Filed: Dec. 10, 2021

(86) PCT No.: PCT/CN2021/137200
§ 371 (c)(1),
(2) Date: Jun. 22, 2023

(87) PCT Pub. No.: WO2022/135186
PCT Pub. Date: Jun. 30, 2022

(65) Prior Publication Data
US 2024/0045640 A1 Feb. 8, 2024

(30) Foreign Application Priority Data
Dec. 24, 2020 (CN) .......................... 202011548741.5

(51) Int. Cl.
*G06F 3/14* (2006.01)
*G06F 3/0485* (2022.01)
*G06F 3/0488* (2022.01)

(52) U.S. Cl.
CPC .......... *G06F 3/1454* (2013.01); *G06F 3/0485* (2013.01); *G06F 3/0488* (2013.01)

(58) Field of Classification Search
CPC ............................... G06F 3/048; G06F 3/1454
See application file for complete search history.

(56) References Cited

U.S. PATENT DOCUMENTS 9,164,779 B2 * 10/2015 Brakensiek ............. G06F 9/452
9,519,452 B2 * 12/2016 Hwang ................. G06F 3/1454
(Continued)

FOREIGN PATENT DOCUMENTS

| CN | 108776572 A | 11/2018 |
| CN | 110673782 A | 1/2020 |

(Continued)

OTHER PUBLICATIONS

"MaowDroid, Fluid Navigation Gestures—non-root, blobbly, customisable gesture navigation for Android!, Nov. 14, 2018, YouTube, https://www.youtube.com/watch?v=Qukj2kmR_B0" (Year: 2018).*

*Primary Examiner* — Sepehr Azari
(74) *Attorney, Agent, or Firm* — Conley Rose, P.C.

(57) ABSTRACT

A device control method includes: a destination projection device, after displaying a projection window of a source projection device, that generates a touch slide event in response to a touch slide operation performed by a user by sliding from outside the projection window to inside the projection window, and when a start touch point of the touch slide operation is located in a target area, converts the touch slide event into an edge slide event of the source projection device, and then sends the edge slide event to the source projection device, where the target area is an area formed by extending a preset distance outward from an edge of the projection window; and the source projection device updates screen display content based on the edge slide event after receiving the edge slide event.

20 Claims, 19 Drawing Sheets

(56) References Cited

U.S. PATENT DOCUMENTS

| | | | |
|---|---|---|---|
| 2012/0098766 A1* | 4/2012 | Dippel | G06F 3/04166 |
| | | | 345/173 |
| 2013/0159915 A1* | 6/2013 | Kim | G06F 3/017 |
| | | | 715/776 |
| 2013/0212483 A1* | 8/2013 | Brakensiek | G06F 9/452 |
| | | | 715/740 |
| 2014/0123080 A1* | 5/2014 | Gan | G06F 3/0488 |
| | | | 715/863 |
| 2015/0169071 A1 | 6/2015 | Jitkoff | |
| 2015/0256593 A1* | 9/2015 | Kelani | G06F 3/04883 |
| | | | 715/740 |
| 2016/0018913 A1* | 1/2016 | Zhang | G06F 3/03547 |
| | | | 345/173 |
| 2016/0259544 A1* | 9/2016 | Polikarpov | G06F 3/0412 |
| 2017/0075560 A1* | 3/2017 | Lederer | G06F 3/04886 |
| 2017/0102872 A1* | 4/2017 | Kim | H04M 1/72403 |
| 2017/0153754 A1* | 6/2017 | Chen | G06F 3/0482 |
| 2017/0195734 A1* | 7/2017 | Park | H04N 21/42224 |

FOREIGN PATENT DOCUMENTS

| | | |
|---|---|---|
| EP | 4184308 A1 | 5/2023 |
| JP | 2015508203 A | 3/2015 |

* cited by examiner (b)

DEVICE CONTROL METHOD AND TERMINAL DEVICE

CROSS-REFERENCE TO RELATED APPLICATIONS

This is a U.S. National Stage of International Patent Application No. PCT/CN2021/137200 filed on Dec. 10, 2021, which claims priority to Chinese Patent Application No. 202011548741.5 filed on Dec. 24, 2020, both of which are hereby incorporated by reference in their entireties.

TECHNICAL FIELD

This application relates to the field of terminal technologies, and in particular, to a device control method and a terminal device.

BACKGROUND

With rapid development of terminal technologies, a device interconnection technology is widely used. Through the device interconnection technology, a user can conveniently transfer content on one terminal device (to be specific, a source projection device) to another terminal device (to be specific, a destination projection device). For example, a projection window of a mobile phone (to be specific, a mirror image of screen content of the mobile phone) can be displayed on a tablet by using a projection function, and the user may perform a gesture operation in the projection window to reversely control the mobile phone.

Currently, a screen-to-body ratio of the terminal device is increasing, and a bezel-less screen has become a mainstream trend. For convenience of the user, major manufacturers develop related bezel-less screen gestures. For example, a related control function (for example, a navigation bar function) may be implemented by using an edge slide gesture that slides inward from an edge of a screen. However, there is a problem of inconvenient operation when the source projection device is controlled by a bezel-less screen gesture on the destination projection device.

SUMMARY in view of this, this application provides a device control method and a terminal device, to improve convenience of performing a reverse control operation by using a bezel-less screen gesture in a projection scenario, thereby improving user experience.

To achieve the foregoing objective, according to a first aspect, an embodiment of this application provides a device control method, applied to a system including a destination projection device and a source projection device. The method includes the following.

The destination projection device displays a projection window of the source projection device.

The destination projection device generates a first touch slide event in response to a first touch slide operation performed by a user by sliding from outside the projection window to inside the projection window.

When a start touch point of the first touch slide operation is located in a target area, the destination projection device converts the first touch slide event into an edge slide event of the source projection device, and sends the edge slide event to the source projection device, where the target area is an area formed by extending a preset distance outward from an edge of the projection window.

The source projection device updates screen display content based on the edge slide event after receiving the edge slide event.

According to the device control method provided in this embodiment, the destination projection device may convert a touch slide event generated by a touch slide operation performed by the user by sliding from outside the projection window to inside the projection window into an edge slide event of the source projection window. In this way, the source projection device may detect an edge slide gesture based on a complete edge slide event, so that a success rate of triggering, by the user, the edge slide gesture of the source projection device on the destination projection device can be improved, thereby improving convenience of a reverse control operation and user experience.

In a possible implementation of the first aspect, the first touch slide event includes a series of touch events generated by the first touch slide operation, and the converting the first touch slide event into an edge slide event of the projection window includes:
converting a touch event whose coordinate is located in the target area and that is in the first touch slide event into a screen edge event of the source projection device; and
generating the edge slide event based on the screen edge event and a touch event whose coordinate is located in the projection window and that is in the first touch slide event.

In the foregoing implementation, the touch event in the target area is converted into the screen edge event of the source projection device. Because the target area includes a touch down event, the complete edge slide event may be obtained based on the screen edge event obtained through conversion and a touch event corresponding to the touch slide operation in the projection window, so that the user can successfully trigger the edge slide gesture of the source projection device.

In a possible implementation of the first aspect, the first touch slide event includes a series of touch events generated by the first touch slide operation, and the convening the first touch slide event into an edge slide event of the projection window includes:
generating a touch down event based on a target event, where the target event is a first touch event generated by the $1^{st}$ touch slide operation in the projection window, and the touch down event is a screen edge event of the source projection device; and
generating the edge slide event based on the touch down event and a touch event that is located in the projection window and that is in the first touch slide event.

In the foregoing implementation, the touch down event that belongs to the screen edge event of the source projection device is generated based on the $1^{st}$ touch event in the projection window, so that the complete edge slide event can be obtained based on the touch down event and the touch event in the projection window. In this way, the user can successfully trigger the edge slide gesture of the source projection device.

In a possible implementation of the first aspect, the generating a touch down event based on a target event includes:
inserting the touch down event before the target event, where a coordinate of the touch down event is the same as a coordinate of the target event.

In a possible implementation of the first aspect, the generating a touch down event based on a target event includes:

converting the target event into the touch down event.

In a possible implementation of the first aspect, the method further includes the following.

When the start touch point of the first touch slide operation is located outside the target area, the destination projection device updates screen display content of the destination projection device in response to the first touch slide event.

In the foregoing implementation, when the start touch point of the first touch slide operation is located outside the target area, the destination projection device uses the operation as an operation for the screen display content of the destination projection device, and responds to the operation. In this way, accuracy of an event response result can be improved, thereby improving user experience.

In a possible implementation of the first aspect, the method further includes the following.

In response to a second touch slide operation performed by the user on the source projection device, the source projection device uses a first area as a screen edge area, and detects an edge slide gesture for a second touch slide event generated by the second touch slide operation.

In response to a third touch slide operation performed by the user by sliding inward from the projection window, the destination projection device generates a third touch slide event corresponding to the source projection device, and sends the third touch slide event to the source projection device.

The source projection device uses a second area as a screen edge area, and detects an edge slide gesture for the third touch slide event after receiving the third touch slide event, where both the first area and the second area are areas formed by extending inward from a screen edge of the source projection device, and coverage of the second area is larger than coverage of the first area.

If the edge slide gesture is detected, the source projection device executes a control function corresponding to the detected edge slide gesture, and updates the screen display content.

In the foregoing implementation, the source projection device uses the first area as the screen edge area, detects an edge slide gesture for a touch slide event triggered by the user on the source projection device, uses the second area larger than the first area as the screen edge area, and detects an edge slide gesture for a received touch slide event. In this way, the success rate of triggering, by the user, the edge slide gesture of the source projection device on the destination projection device can be improved, thereby improving reliability of the reverse control operation and user experience.

In a possible implementation of the first aspect, the edge slide gesture is a gesture of returning to a previous level, a gesture of returning to a home screen, or a gesture for a recent task list.

In a possible implementation of the first aspect, the method further includes the following.

The source projection device sends the screen display content to the destination projection device.

The destination projection device displays the screen display content in the projection window after receiving the screen display content.

In the foregoing implementation, after updating the screen display content, the source projection device sends the screen display content to the destination projection device. In this way, the destination projection device can update content of the projection window in time.

According to a second aspect, an embodiment of this application provides a device control method, applied to a destination projection device. The method includes:
   displaying a projection window of a source projection device;
   generating a touch slide event in response to a touch slide operation performed by a user by sliding from outside the projection window to inside the projection window; and
   when a start touch point of the touch slide operation is located in a target area, converting the touch slide event into an edge slide event of the source projection device, and sending the edge slide event to the source projection device, where the target area is an area formed by extending a preset distance outward from an edge of the projection window.

In a possible implementation of the second aspect, the touch slide event includes a series of touch events generated by the touch slide operation, and the converting the touch slide event into an edge slide event of the projection window includes:
   converting a touch event whose coordinate is located in the target area and that is in the touch slide event into a screen edge event of the source projection device; and
   generating the edge slide event based on the screen edge event and a touch event whose coordinate is located in the projection window and that is in the touch slide event.

In a possible implementation of the second aspect, the touch slide event includes a series of touch events generated by the touch slide operation, and the converting the touch slide event into an edge slide event of the projection window includes:
   generating a touch down event based on a target event, where the target event is the $1^{st}$ touch event generated by the touch slide operation in the projection window, and the touch down event is a screen edge event of the source projection device; and
   generating the edge slide event based on the touch down event and a touch event that is located in the projection window and that is in the touch slide event.

In a possible implementation of the second aspect, the generating a touch down event based on a target event includes:
   inserting the touch down event before the target event, where a coordinate of the touch down event is the same as a coordinate of the target event.

In a possible implementation of the second aspect, the generating a touch down event based on a target event includes:
   converting the target event into the touch down event.

In a possible implementation of the second aspect, the method further includes:
   when the start touch point of the touch slide operation is located outside the target area, updating screen display content of the destination projection device in response to the touch slide event.

In a possible implementation of the second aspect, the method further includes:
   receiving screen display content that corresponds to the touch slide event and is sent by the source projection device, and displaying the screen display content in the projection window.

According to a third aspect, an embodiment of this application provides a device control method, applied to a source projection device. The method includes:

if the touch slide operation performed by a user on the source projection device is received, using a first area as a screen edge area, and detecting an edge slide gesture for a touch slide event generated by a touch slide operation;

if the touch slide event sent by a destination projection device is received, using a second area as a screen edge area, and detecting an edge slide gesture for a received touch slide event, where both the first area and the second area are areas formed by extending inward from a screen edge of the source projection device, and coverage of the second area is larger than coverage of the first area; and executing a control function corresponding to the detected edge slide gesture, and updating screen display content.

According to a fourth aspect, an embodiment of this application provides a device control apparatus, applied to a destination projection device. The apparatus includes:

a display module, configured to display a projection window of a source projection device;

an input module, configured to receive a touch slide operation performed by a user by sliding from outside the projection window to inside the projection window;

a processing module, configured to generate a touch slide event in response to the touch slide operation, and convert the touch slide event into an edge slide event of the source projection device when a start touch point of the touch slide operation is located in a target area, where the target area is an area formed by extending a preset distance outward from an edge of the projection window; and a communication module, configured to send the edge slide event to the source projection device.

In a possible implementation of the fourth aspect, the touch slide event includes a series of touch events generated by the touch slide operation. The processing module is specifically configured to:

convert a touch event whose coordinate is located in the target area and that is in the touch slide event into a screen edge event of the source projection device; and generate the edge slide event based on the screen edge event and a touch event whose coordinate is located in the projection window and that is in the touch slide event.

In a possible implementation of the fourth aspect, the touch slide event includes a series of touch events generated by the touch slide operation. The processing module is specifically configured to:

generate a touch down event based on a target event, where the target event is the $1^{st}$ touch event generated by the touch slide operation in the projection window, and the touch down event is a screen edge event of the source projection device; and generate the edge slide event based on the touch down event and a touch event that is located in the projection window and that is in the touch slide event.

In a possible implementation of the fourth aspect, the processing module is specifically configured to:

insert the touch down event before the target event, where a coordinate of the touch down event is the same as a coordinate of the target event.

In a possible implementation of the fourth aspect, the processing module is specifically configured to:

convert the target event into the touch down event.

In a possible implementation of the fourth aspect, the processing module is further configured to:

when the start touch point of the touch slide operation is located outside the target area, update screen display content of the destination projection device by using the display module in response to the touch slide event.

In a possible implementation of the fourth aspect, the communication module is further configured to receive screen display content that corresponds to the touch slide event and is sent by the source projection device.

The display module is fun configured to display the screen display content in the projection window.

According to a fifth aspect, an embodiment of this application provides a device control apparatus, applied to a source projection device. The apparatus includes an input module, a processing module, a communication module, and a display module.

The processing module is configured to: when the input module receives a touch slide operation performed by a user on the source projection device, use a first area as a screen edge area and detect an edge slide gesture for a touch slide event generated by the touch slide operation.

The processing module is further configured to: when the communication module receives a touch slide event sent by a destination projection device, use a second area as a screen edge area, and detect an edge slide gesture for the received touch slide event, where both the first area and the second area are areas formed by extending inward from a screen edge of the source projection device, and coverage of the second area is larger than coverage of the first area.

The processing module is further configured to execute a control function corresponding to the detected edge slide gesture, and update screen display content by using the display module.

According to a sixth aspect, an embodiment of this application provides a terminal device, including a memory and a processor. The memory is configured to store a computer program. The processor is configured to perform the method according to the second aspect or the third aspect when invoking the computer program.

According to a seventh aspect, an embodiment of this application provides a computer-readable storage medium, storing a computer program. When the computer program is executed by a processor, the method according to the second aspect or the third aspect is implemented.

According to an eighth aspect, an embodiment of this application provides a computer program product. When the computer program product runs on a terminal device, the terminal device is enabled to perform the method according to the second aspect or the third aspect.

According to a ninth aspect, an embodiment of this application provides a chip system, including a processor. The processor is coupled to a memory, and the processor executes a computer program stored in the memory, to implement the method according to the second aspect or the third aspect. The chip system may be a single chip or a chip module including a plurality of chips.

It may be understood that, for beneficial effects of the second aspect to the ninth aspect, refer to related descriptions in the first aspect. Details are not described herein again.

DESCRIPTION OF EMBODIMENTS

The following describes embodiments of this application with reference to accompanying drawings in embodiments of this application. Terms used in implementations of embodiments of this application are merely used to explain specific embodiments of this application, but are not intended to limit this application.

Figure 1:
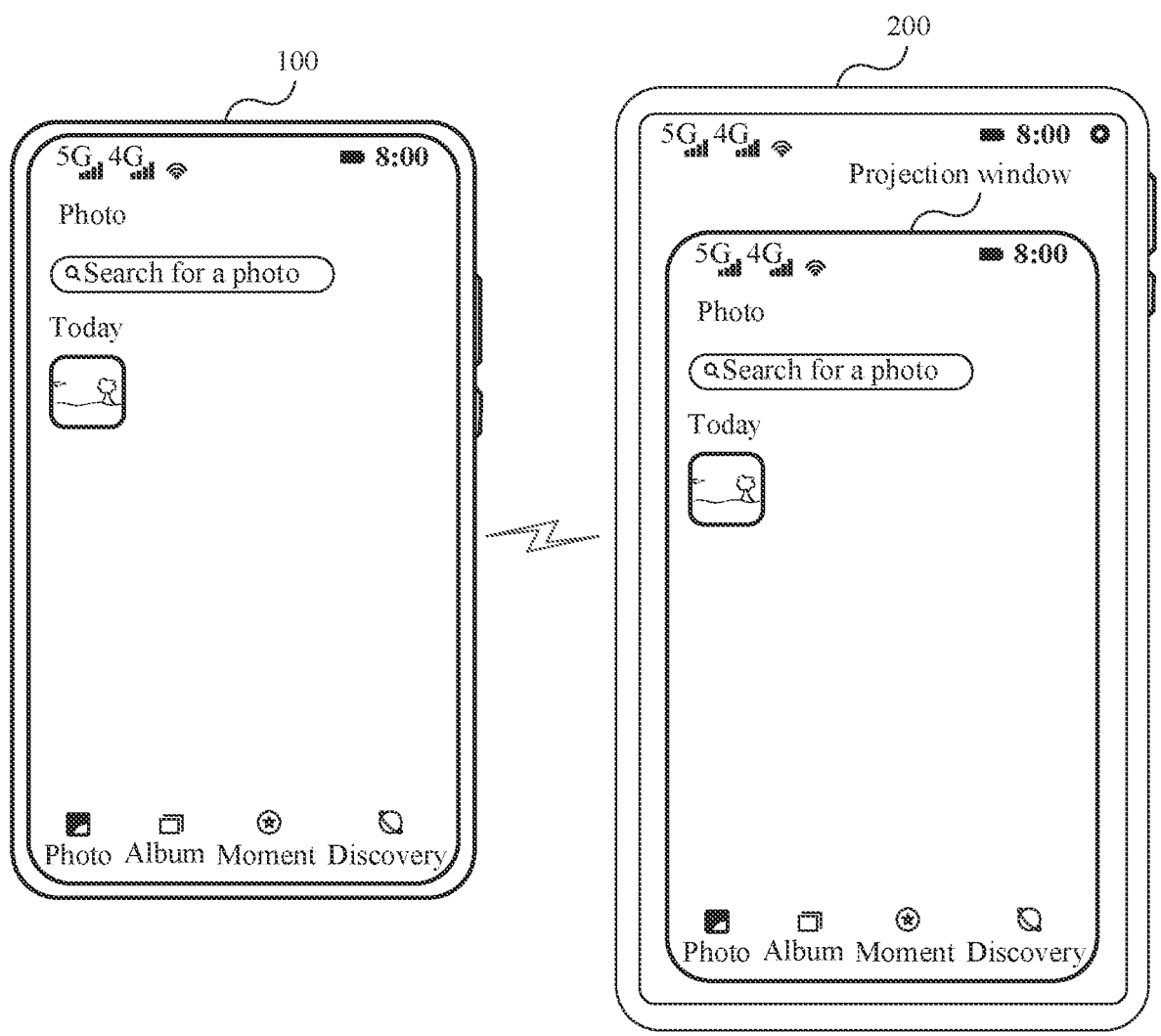
FIG. 1 is a schematic diagram of a projection scenario according to an embodiment of this application.

FIG. 1 is a schematic diagram of a projection scenario according to an embodiment of this application. As shown in FIG. 1, the projection scenario includes a source projection device 100 and a destination projection device 200.

The source projection device 100 and the destination projection device 200 may be terminal devices such as a mobile phone, a tablet computer, a notebook computer, a desktop computer, a wearable device, or a smart TV. A same terminal device may be used as the source projection device 100, or may be used as the destination projection device 200. There may be one or more source projection devices 100 and one or more destination projection devices 200. To be specific, one source projection device 100 may project screen display content to a plurality of destination projection devices 200 for display, and one destination projection device 200 may also simultaneously display screen display content of a plurality of source projection devices 100. In FIG. 1, an example in which the projection scenario includes two terminal devices is used for description, where the source projection device 100 is a mobile phone, and the destination projection device 200 is a tablet computer.

The source projection device 100 and the destination projection device 200 may be connected in a wireless communication manner, for example, wireless communication manners such as wireless fidelity (wireless fidelity, Wi-Fi), Bluetooth (Bluetooth, BT), or near field communication (near field communication, NFC). Alternatively, the source projection device 100 and the destination projection device 200 may be connected in a wired manner, for example, connected through a data line.

After the source projection device 100 and the destination projection device 200 establish a connection, the source projection device 100 may send screen display content to the destination projection device 200, and the destination projection device 200 may display the screen display content of the source projection device 100 in a projection window. The projection window may be displayed in a manner of a floating window. The destination projection device 200 may also feed back, to the source projection device 100, an operation event (for example, a tap event or a touch slide event) triggered by a user in the projection window. The source projection device 100 may update the screen display content based on the received operation event. The display content of the projection window in the destination projection device 200 is correspondingly updated. That is, the user may reversely control the source projection device 100 on the destination projection device 200. For example, the user may simulate an edge slide gesture (where the edge slide gesture may also be referred to as a screen gesture, a bezel-less screen gesture, screen gesture navigation, a screen navigation gesture, or the like) of the source projection device 100 in the projection window of the destination projection device 200, and slide inward from a window edge of the projection window, to control the source projection device 100 to perform a corresponding function.

The following describes a process in which the terminal device detects the edge slide gesture.

To detect the edge slide gesture, the terminal device pre-determines (for example, determines when being powered on) a hot zone (namely, a screen edge area) for detecting the edge slide gesture, where the screen edge area is invisible to the user. When a touch slide operation of the user is detected, the terminal device detects the edge slide gesture based on the screen edge area. A slide start position of the edge slide gesture needs to be located in the screen edge area.

Figure 2:
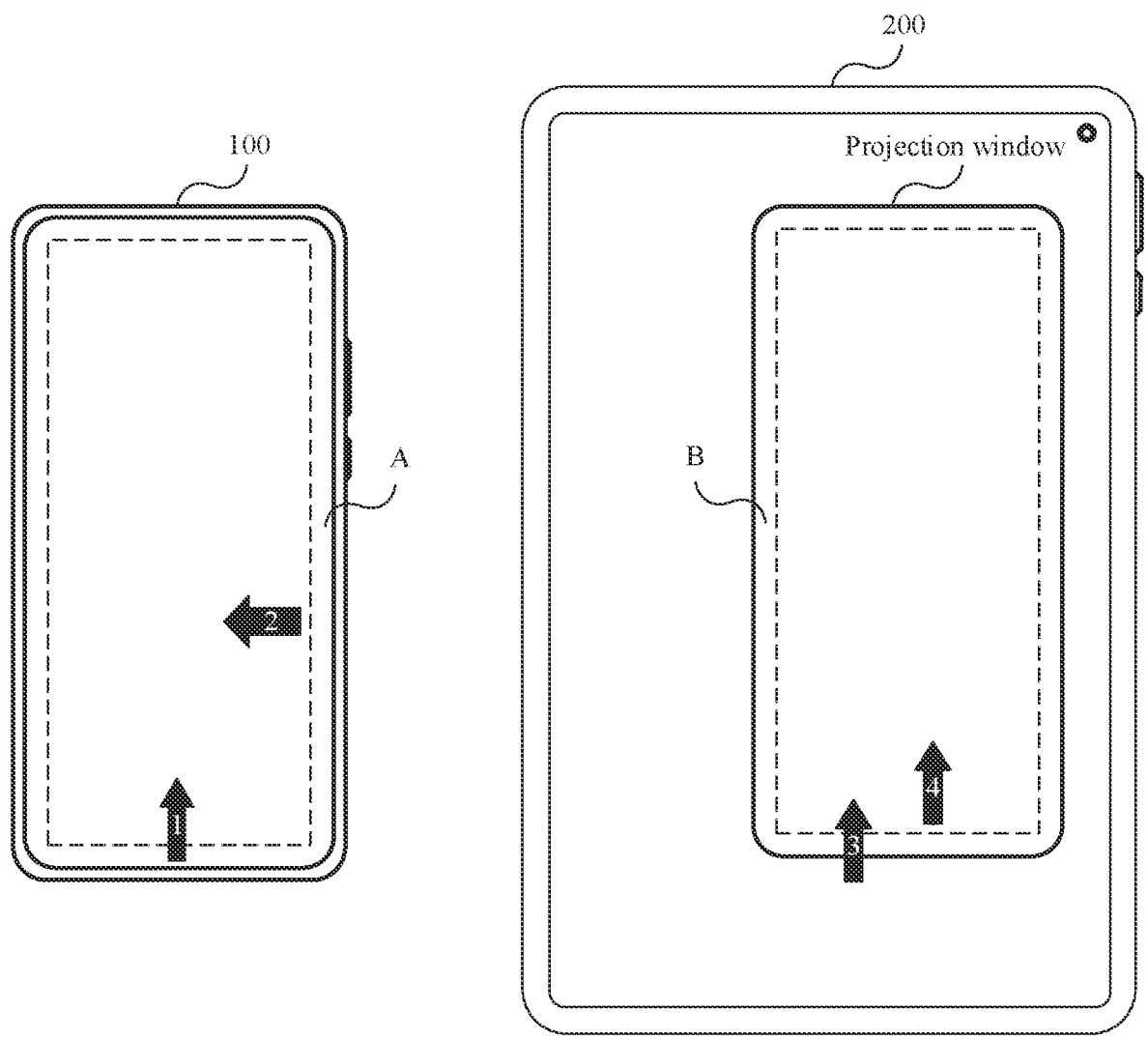
FIG. 2 is a schematic diagram of a touch slide operation according to an embodiment of this application.

FIG. 2 is a schematic diagram of a touch slide operation according to an embodiment of this application. As shown in FIG. 2, a screen edge area A is an area formed by extending inward from a screen edge, and may include a left edge area, a right edge area, an upper edge area, and/or a lower edge area. Widths (to be specific, distances between inner edges and outer edges namely, screen edges)) of the edge areas may be the same, and a specific size may be, for example, 2 mm or another value.

An edge slide gesture may include: a navigation bar function gesture triggered by sliding left inward, sliding right inward, or sliding up inward to implement a navigation bar function; a quick switching application gesture triggered by sliding left and right along the lower edge area or sliding upward in an arc line from the lower edge area to quickly switch to a previous application or a next application; a split-screen window enabling gesture triggered by sliding inward from a left or right edge of a screen and pausing to enable a split-screen application list; and an edge slide gesture for implementing another function.

A user may select a gesture navigation mode from a system navigation mode setting function, to enable a navigation bar function gesture recognition function and a quick switching application gesture recognition function of a terminal device, or may select another navigation mode, for example, a three-key navigation mode, from the system navigation mode setting function to disable the navigation bar function gesture recognition function and the quick switching application gesture recognition function of the terminal device. For ease of describing technical solutions in embodiments of this application, unless otherwise specified subsequently, the terminal device performs system navigation in the gesture navigation mode, that is, the gesture navigation mode is in an enabled state.

Specifically, the navigation bar gesture may specifically include a gesture of returning to a previous level, a gesture of returning to a home screen, and a gesture for a recent task list. The gesture of returning to the previous level may be triggered by sliding inward from the left edge area or the right edge area for a specific distance. The gesture of returning to the home screen may be triggered by sliding upward from the lower edge area for a specific distance. The gesture for the recent task list may be triggered by sliding upward from the lower edge area for a specific distance and pausing, or triggered by sliding upward for a further distance.

For ease of description, in this embodiment of this application, the navigation bar function gesture is used as an example for description. Unless otherwise specified subsequently, the edge slide gesture represents the navigation bar function gesture.

As shown in FIG. 2, an arrow indicates the touch slide operation. When detecting the edge slide gesture, the terminal device determines whether a start position (namely, a start touch point) of the touch slide operation is located in the screen edge area A. Only a touch slide operation whose start position is located in the screen edge area A may be considered as an edge slide gesture. As shown in the figure, a start position of a touch slide operation indicated by an arrow 1 is located in the screen edge area A, and an edge slide gesture may be triggered. A start position of a touch slide operation indicated by an arrow 2 is located outside the screen edge area A. Therefore, it is considered that the touch slide operation is not performed from the screen edge, and an edge slide gesture is not triggered.

When the terminal device is used as a source projection device 100, the user may start to slide inward in a window edge area of a projection window on a destination projection device 200, to trigger an edge slide gesture of the source projection device 100. As shown in FIG. 2, a window edge area B of the projection window corresponds to the screen edge area A of the source projection device 100. For example, screen display content of the source projection device 100 is displayed in the projection window in 1:1 mode. A size of the window edge area B is the same as that of the screen edge area A.

Figure 3:
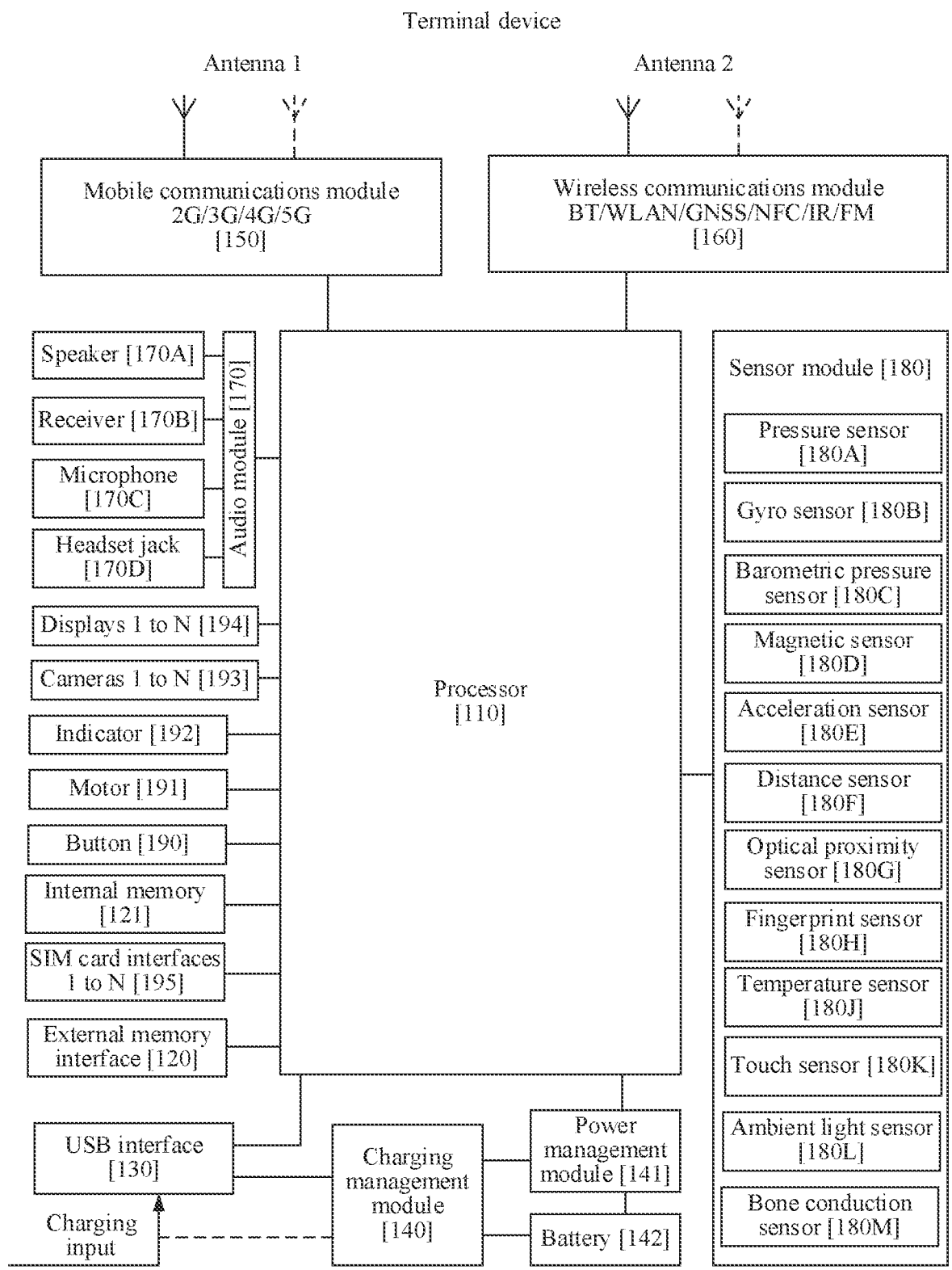
FIG. 3 is a schematic diagram of a structure of a terminal device according to an embodiment of this application.

In an actual operation, because the window edge area B is small, when the user performs an operation on the destination projection device 200, it is difficult to make the start position of the touch slide operation in the window edge area B, and cases shown by an arrow 3 and an arrow 4 often occur. Therefore, a case in which the edge slide gesture of the source projection device 100 fails to be triggered is likely to occur. Based on the foregoing problem, an embodiment of this application provides a device control method, to improve a success rate of triggering, by the user, the edge slide gesture of the source projection device 100 on the destination projection device 200, thereby improving reliability of a reverse control operation and user experience. The device control method may be applied to the foregoing terminal device. The following first describes a structure of the terminal device by using a mobile phone as an example, FIG. 3 is a schematic diagram of a structure of a terminal device according to an embodiment of this application.

The terminal device may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the terminal device. In some other embodiments of this application, the terminal device may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the terminal device. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 140 is configured to receive a charging input from a charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the terminal device. The charging management module 140 may further supply power to the terminal device by using the power management module 141 while charging the battery 142.

The power management module 141 is configured to connect the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a batter capacity, a battery cycle count, and a battery health status (electric leakage and impedance). In some other embodiments, the power management module 141 may alternatively be disposed in the processor 110. In some other embodiments, the power management module 141 and the charging management module 140 may alternatively be disposed in a same device.

A wireless communications function of the terminal device may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the terminal device may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that is applied to the terminal device and includes 2G/3G/4G/5G or the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The wireless communications module 160 may provide a wireless communication solution that is applied to the terminal device and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more devices integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the terminal device are coupled, and the antenna 2 and the wireless communications module 160 in the terminal device are coupled, so that the terminal device can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-synchronous code division multiple access (time division-synchronous code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GNSS), a BeiDou navigation satellite system (BeiDou navigation satellite system, BDS), a quasi-zenith satellite system (quasi-zenith satellite system, QZSS), and/or a satellite-based augmentation system (satellite-based augmentation system, SBAS).

The terminal device may implement a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Mini LED, a Micro LED, a quantum dot light emitting diode (quantum dot light emitting diode, QLED), or the like. In some embodiments, the terminal device may include one or N displays 194, where N is a positive integer greater than 1.

The terminal device can implement a photographing function by using the ISP, the camera 193, the video codec, the GPU, the display 194, the application processor, and the like.

The external memory interface 120 may be configured to connect to an external storage card, fur example, a Micro SD card, to extend a storage capability of the terminal device. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the terminal device and data processing. The internal memory 121 may include a program storage area and a data storage area. The program storage area may store an operating system, an application required by at least one function (for example, a sound playing function or an image playing function), and the like. The data storage area may store data (such as audio data and a phone book) and the like that are created during use of the terminal device. In addition, the internal memory 121 may include a high-speed random access memory, and may further include a nonvolatile memory, for example, at least one magnetic disk storage device, a flash memory device, or a universal flash storage (universal flash storage, UFS).

The terminal device may implement an audio function, for example, music playing and recording, through the audio module 170, the speaker 170A, the receiver 170B, the microphone 170C, the headset jack 170D, the application processor, and the like.

Figure 4:
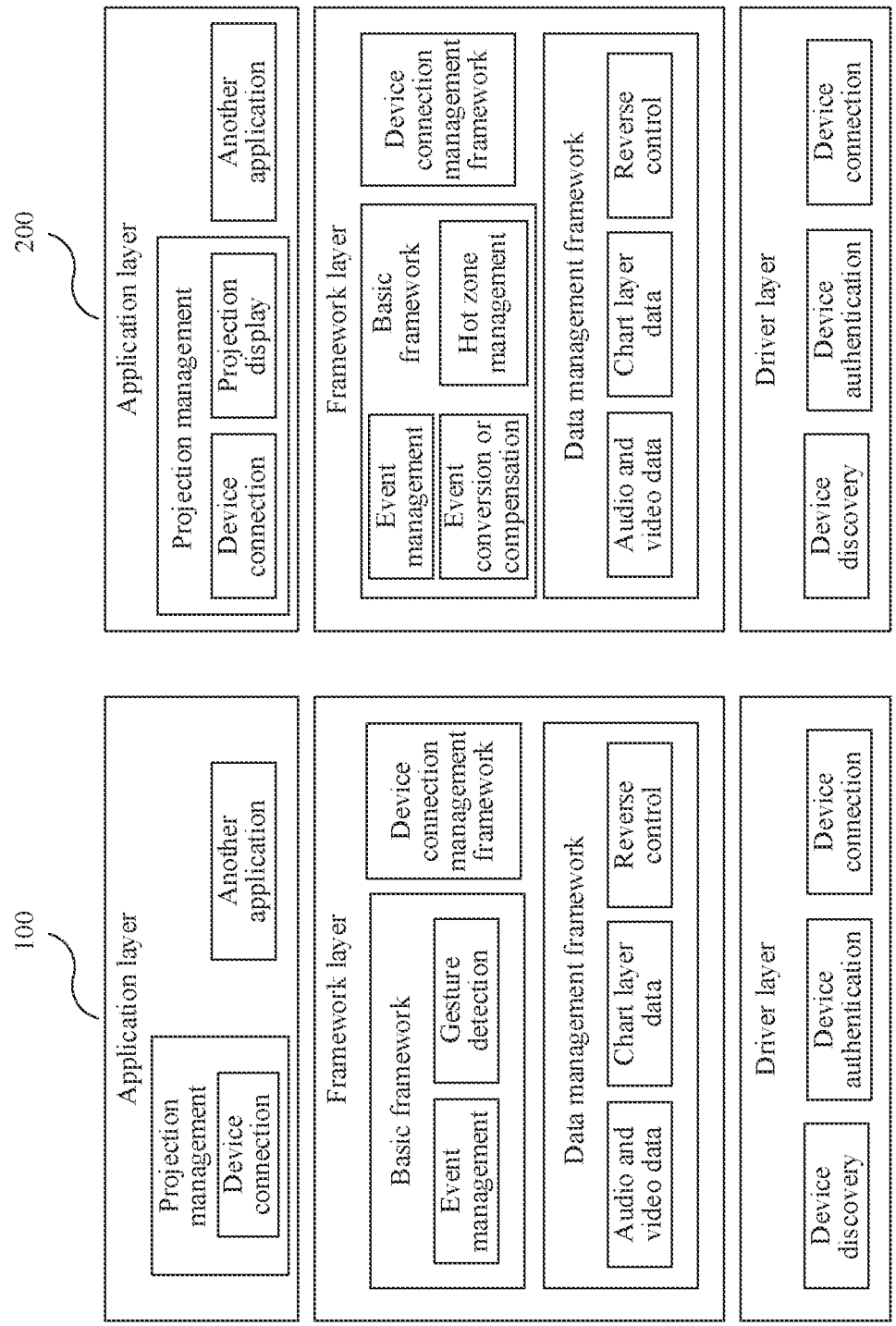
FIG. 4 is a schematic diagram of a software architecture of a terminal device according to an embodiment of this application.

FIG. 4 is a schematic diagram of a software architecture of a terminal device according to an embodiment of this application. As described above, the terminal device in a projection scenario includes a source projection device 100 and a destination projection device 200. Functions performed by the source projection device 100 and the destination projection device 200 are different, and corresponding software architectures are also different. The figure shows an example of the software architectures of the source projection device 100 and the destination projection device 200.

It may be understood that, the figure shows only the software architectures when the terminal device is separately used as the source projection device 100 and the destination projection device 200. When the terminal device has the functions of both the source projection device 100 and the destination projection device 200, the software architecture of the terminal device is a set of the software architectures of the source projection device 100 and the destination projection device 200. In addition, the software architectures of the source projection device 100 and the destination projection device 200 are similar. For ease of description, unless otherwise specified, the terminal device may represent the source projection device 100 and the destination projection device 200 below.

A software system of the terminal device may be divided into several layers. As shown in FIG. 4, in some embodiments, the software system may be divided into an application layer, a framework layer, and a driver layer from top to bottom.

The application layer may include a series of applications (applications, APPs). The applications may include a projection management APP related to projection, and may further include other APPs such as Camera, Gallery, Phone, Maps, Browser, Music, Videos, and Messages.

The projection management APP may include a device connection APP, configured to manage a connection between terminal devices. The projection management APP in the destination projection device 200 may further include a projection display APP, configured to display screen display content of the source projection device 100.

The framework layer provides an application programming interface (application programming interface, API) and a programming framework for the application at the application layer.

As shown in FIG. 4, the framework layer may include a basic framework, a device connection management framework, a data management framework, and the like of the system. The basic framework may include an event management module configured to distribute an event. The source projection device may further include a gesture detection module configured to detect a gesture. In addition, the basic framework may further include another basic capability module (not shown), for example, a window management module configured to manage a window program. The device connection management framework is for managing a cross-device connection protocol. The data management framework is for managing data communication in a cross-device scenario (for example, a projection scenario). For example, an audio and video data module is used by the source projection device 100 to transmit audio and video data to the destination projection device 200. A chart layer data module is used by the source projection device 100 to transmit chart layer data to the destination projection device 200. A reverse control module is used by the destination projection device 200 to transmit event data to the source projection device 100.

In this embodiment of this application, to improve reliability of a reverse control operation, after a touch slide operation of sliding from outside a projection window to inside the projection window is detected, the destination projection device 200 may perform event conversion or compensation on a touch slide event generated by a touch slide operation whose start position falls into a hot zone, to generate an edge slide event of the source projection device. The hot zone may be a target area formed by extending a preset distance outward from an edge of the projection window. Correspondingly, an event conversion compensation module and a hot zone management module may be added to the destination projection device 200. The hot zone management module may manage information such as a size and a position of the hot zone. The event conversion compensation module may determine an event in the target area based on the hot zone information, and perform event conversion or compensation on the determined event. For a specific processing process, refer to a subsequent method embodiment.

The event conversion compensation module may be located in the basic framework, or may be located in the device connection APP. The hot zone management module may be an independent module, or may be integrated into another existing module. For example, if the window management module manages window information of the projection window, area information of the target area may be added to the window management module, to implement a function of the hot zone management module. In the figure, an example in which the event conversion compensation module is located in the basic framework and the hot zone management module is an independent module is used for description.

The driver layer is for providing functions such as discovery, authentication, and connection of the terminal device, and correspondingly, may include functional modules such as a device discovery module, a device authentication module, and a device connection module. The device connection APP may search and discover another terminal device by using the device discovery module, perform authentication between the terminal devices by using the device authentication module, and then establish a connection between the terminal devices by using the device connection module.

It may be understood that the framework layer and the driver layer show only some modules related to the projection scenario, and may further include other modules. For example, the framework layer may further include a notification management module, and the driver layer may further include a display driver, a sensor driver, and the like. The other modules specifically included in the framework layer and the driver layer are not particularly limited in this embodiment.

The following describes an example of a reverse control procedure of the source projection device 100 and the destination projection device 200 with reference to the projection scenario.

After a touch sensor 180K in the destination projection device 200 receives a touch operation, a corresponding hardware interrupt is sent to the driver layer. The driver layer may encapsulate the touch operation into a touch event (for example, a touch down (action down) event, a touch move (action move) event, and a touch up (action up) event), and may report the touch event to the framework layer. A series of touch events are generated in a process of one touch slide operation of a user. After receiving each touch event, the event management module of the framework layer may determine a window corresponding to the touch event based on a coordinate of the touch event. When a window corresponding to the touch down event is a hot zone, and a window corresponding to the touch up event is a projection window, the event conversion compensation module may be invoked, and a coordinate of each touch event may be mapped to a corresponding coordinate in a screen area of the source projection device 100. The event conversion compensation module may obtain the hot zone information from the hot zone management module, perform, based on the hot zone information, event conversion or compensation on a touch event obtained through coordinate mapping, and then return the touch event to the event management module. Then, the event management module may distribute these touch events to the projection management APP, and the device connection APP in the projection management APP may invoke the reverse control module to transmit the touch events to the source projection device 100.

After receiving the touch events, the reverse control module of the source projection device 100 may report the touch events to the projection management APP, and invoke the gesture detection module by using the projection management APP, or directly report the touch events to the gesture detection module. The gesture detection module detects gestures (for example, edge slide gestures) for a series of received touch events, and may report a gesture detection result to a related application at the application layer after the gesture is detected. The related application at the application layer may refresh screen display content based on the detected gesture, and may invoke the chart layer data module in the data management framework to transmit the refreshed screen display content to the destination projection device 200. After the chart layer data module of the destination projection device 200 receives the refreshed screen display content, the projection display APP refreshes display content of the projection window based on the screen display content received by the chart layer data module.

The following describes the device control method provided in embodiments of this application.

When a user wants to trigger an edge slide gesture on a source projection device, a touch slide operation performed by the user on a destination projection device for a projection window may include the following two cases: In a first case, a start position of the touch slide operation is located outside the projection window (for example, a touch slide operation shown by an arrow 3 in FIG. 2); and in a second case, a start position of the touch slide operation is located in the projection window (for example, a touch slide operation shown by an arrow 4 in FIG. 2). The following separately describes device control processes in the two cases.

In the first case, the start position of the touch slide operation is located outside the projection window.

For the source projection device, an edge slide event that can trigger the edge slide gesture should meet an integrity requirement. A complete edge slide event includes the following several elements: one touch down event (referred to as a down event for short), a plurality of touch move events (referred to as move events for short), and one touch up event (referred to as an up event for short).

When the start position of the touch slide operation input by the user on the destination projection device is located outside the projection window; a corresponding down event is also located outside the projection window. To ensure that the edge slide event transmitted to the source projection device meets the integrity requirement, in this embodiment, after generating a touch slide event in response to a touch slide operation input by the user by sliding from outside the projection window to inside the projection window, the destination projection device may perform event conversion or compensation processing on the touch slide event generated by the touch slide operation, generate a complete edge slide event starting from an edge of the projection window, and then send the complete edge slide event to the source projection device, to improve a success rate of triggering, by the user, the edge slide gesture of the source projection device on the destination projection device.

Considering that an end position of the touch slide operation that is triggered by the user on the destination projection device and that is for controlling the destination projection device may also fall into the projection window, in this embodiment, the destination terminal device may use a target area around the projection window as a detection hot zone (referred to as a hot zone for short), and perform event conversion or compensation processing on a touch slide event generated by a touch slide operation whose start position falls into the hot zone.

Figure 5:
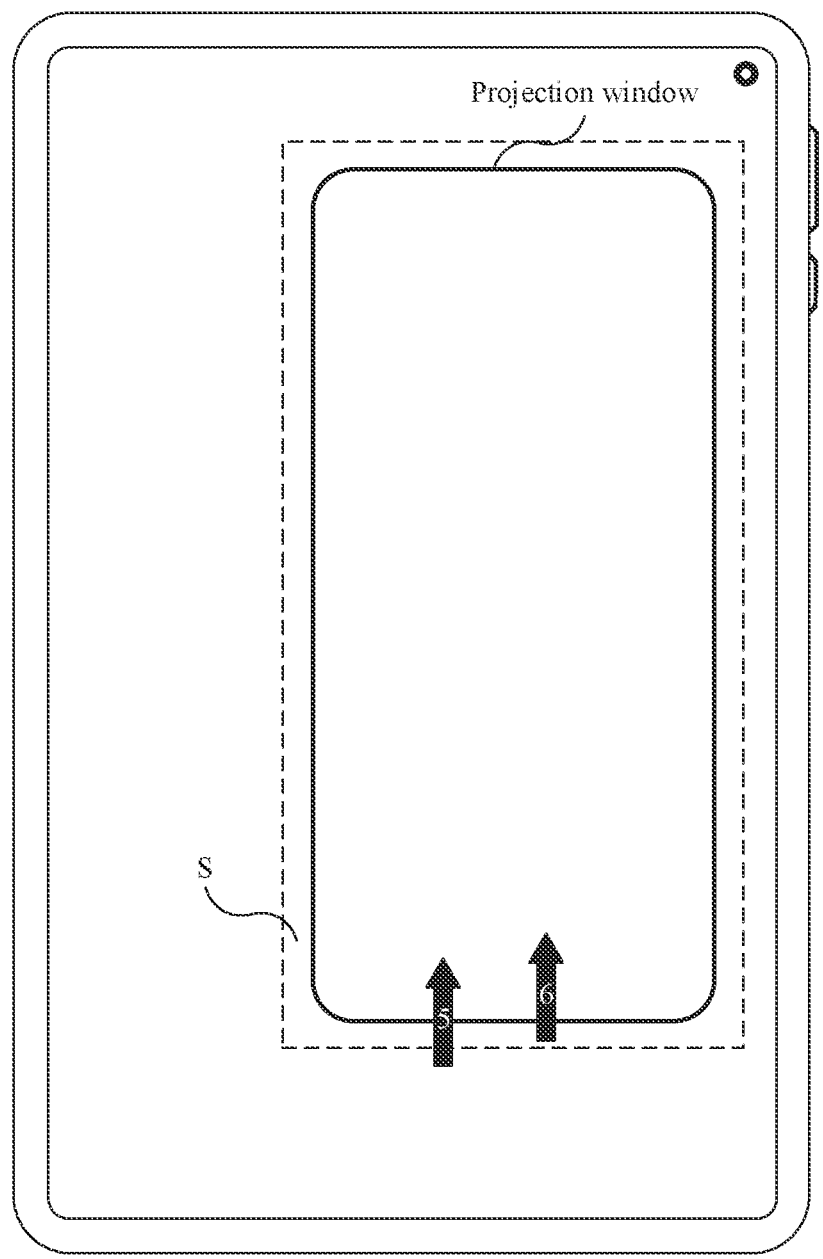
FIG. 5 is a schematic diagram of a target area according to an embodiment of this application.

FIG. 5 is a schematic diagram of a target area according to an embodiment of this application. As shown in FIG. 5, the target area S is an area formed by extending a preset distance outward from an edge of a projection window, and is similar to the screen edge area A shown in FIG. 2. The target area S may include a plurality of areas in four sub-areas: upper, lower, tell, and right. Widths of the sub-areas may be the same, for example, 2 mm, or widths of the sub-areas may be different. In the figure, an example in which the target area S includes four sub-areas with a same width is used for description.

As shown in FIG. 5, a case in which a start position of a touch slide operation is located outside the projection window may specifically further Maude two cases: In a first case, as shown by an arrow 5 in FIG. 5, the start position of the touch slide operation is located outside the target area S; and in a second case, as shown by an arrow 6 in FIG. 5, the start position of the touch slide operation is located in the target area S. For the two different cases, the destination projection device may perform different event processing processes. The following describes the event processing processes.

Figure 6:
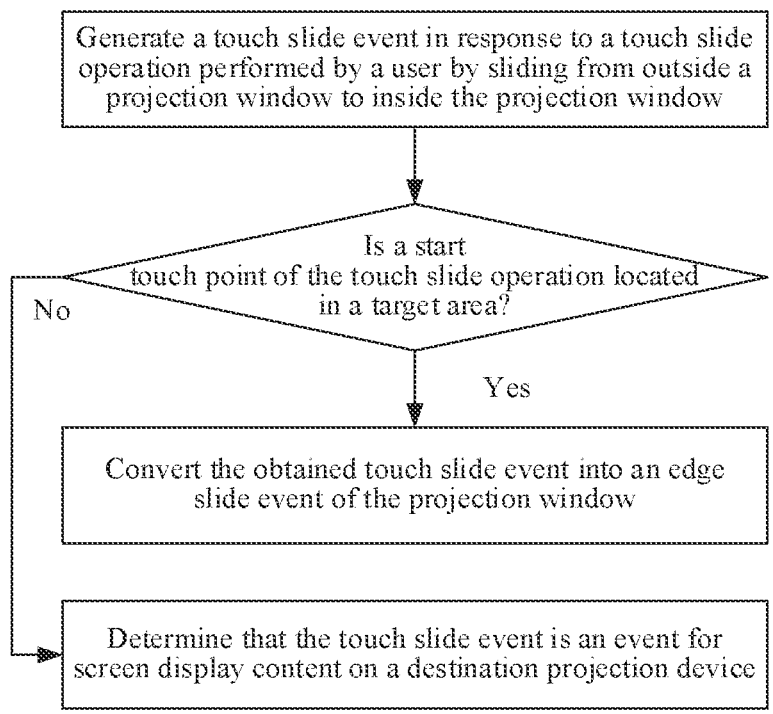
FIG. 6 is a schematic diagram of an event processing process according to an embodiment of this application.

FIG. 6 is a schematic diagram of an event processing process according to an embodiment of this application. As shown in FIG. 6, a destination projection device may generate a touch slide event in response to a touch slide operation performed by a user by sliding from outside a projection window to inside the projection window. In addition, the destination projection device may determine whether a start touch point of the touch slide operation is located in a target area. If the start touch point of the touch slide operation is located in the target area, the obtained touch slide event may be converted into an edge slide event of the projection window. If the start touch point of the touch slide operation is located outside the target area, the touch slide event may be determined as an event for screen display content on the destination projection device.

Specifically, the destination projection device may generate a series of touch events based on the touch slide operation of the user, and may obtain an event sequence of corresponding touch slide events based on a coordinate and time of each touch event. For the 1$^{st}$ touch event (to be specific, a touch event corresponding to the start touch point of the touch slide operation) in the event sequence, whether a coordinate of the touch event is located in the target area may be determined. If the coordinate of the touch event is located in the target area, it may be considered that the touch slide operation is an edge slide operation for the projection window. In this case, the touch slide event may be converted into an edge slide event of the source projection device. If the coordinate of the touch event is located outside the target area, it may be considered that the touch slide operation is a slide event for the screen display content on the destination projection device. In this case, a control function corresponding to the touch slide event may be performed, for example, screen content scrolling or interface switching.

When generating the edge slide event, in an optional implementation, in this embodiment, the destination projection device may perform event coordinate conversion on a touch event (referred to as a hot zone event herein) whose coordinate is located in the target area (namely, a hot zone) and that is in the touch slide event, so that the hot zone event becomes a screen edge event of the source projection device. The edge slide event is generated based on these screen edge events and a touch event that is located in the projection window and that is in the touch slide event.

Specifically, before the event coordinate conversion is performed, coordinate mapping may be first performed on each touch event in the touch slide event. As described above, after generating the touch event, the destination projection device may map a coordinate of the touch event in the projection window to a corresponding coordinate in a screen area of the source projection device. In this embodiment, the destination projection device may also map, based on a same coordinate mapping manner, the coordinate of each touch event in the touch slide event to a corresponding coordinate in the screen area of the source projection device, that is, a screen coordinate of the touch event on the destination projection device is mapped to a screen coordinate on the source projection device.

Figure 7:
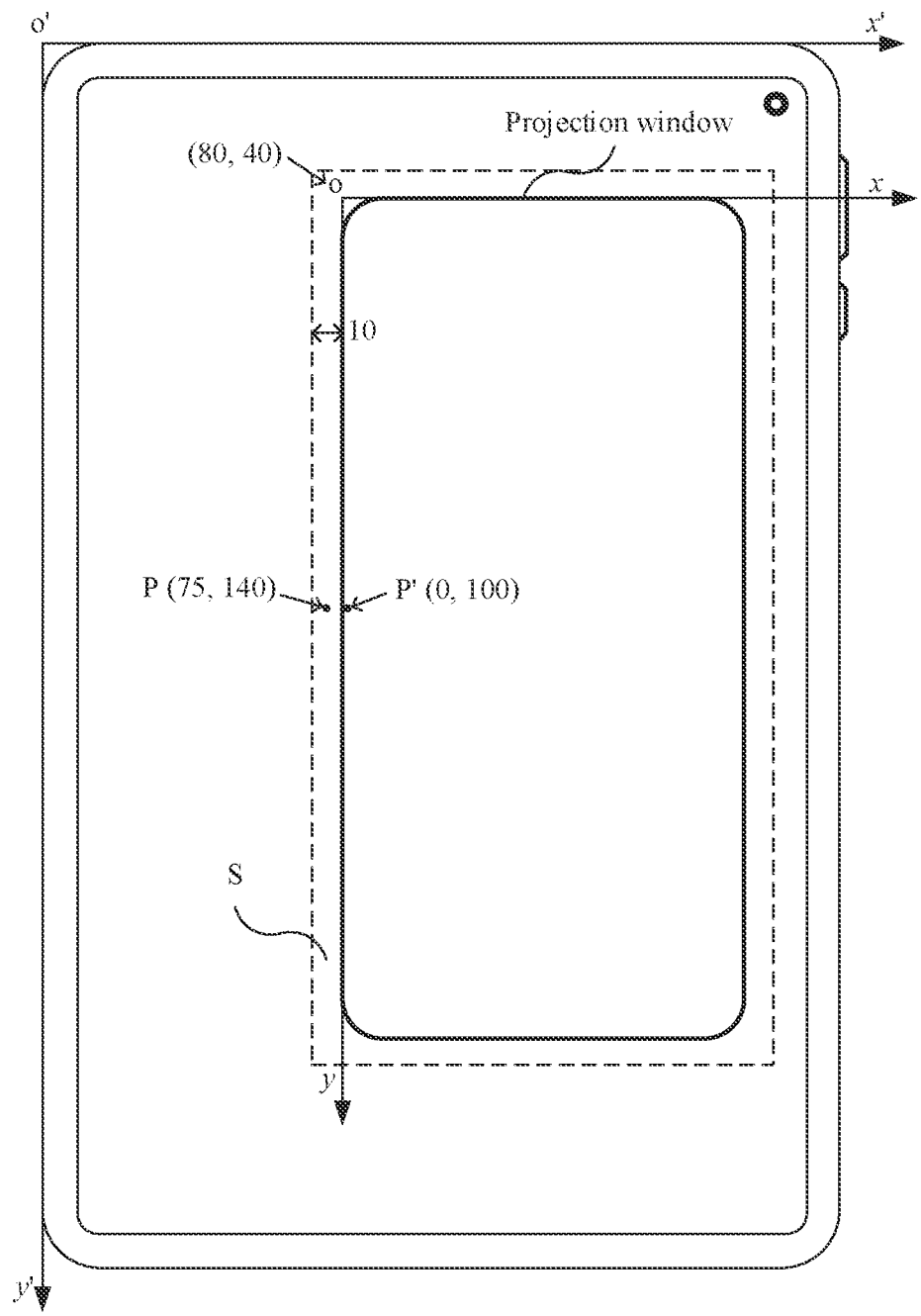
FIG. 7 is a schematic diagram of event coordinate conversion according to an embodiment of this application.

As shown in FIG. 7, a screen coordinate system of the projection window is xy, and a coordinate origin o is located in an upper left corner of the projection window. A screen coordinate system of the destination projection device is x'y', and a coordinate origin o' is located in an upper left corner of a screen of the destination projection device. Based on coordinates of o in the x'y' coordinate system, a coordinate mapping relationship between the two coordinate systems may be obtained. If the coordinates of o in the x'y' coordinate system is $(x_0, y_0)$, the coordinate mapping relationship between the two coordinate systems is as follows:

$$\begin{cases} x = x' - x_0 \\ y = y' - y_0 \end{cases} \quad (1)$$

(x', y') represents coordinates (to be specific, screen coordinates on the destination projection device) of any point on the screen of the destination projection device in the x'y' coordinate system. (x, y) represents corresponding coordinates (to be specific, window coordinates relative to the projection window) of the point in the xy coordinate system. When screen display content of the source projection device is displayed in the projection window in 1:1 mode, (x, y) is screen coordinates of the point on the source projection device. When the screen display content of the source projection device is scaled up or down in the projection window, x, y) may be inversely scaled up or down, to obtain the screen coordinates of the point on the source projection device. For example, if the projection window is 1.5 times larger than a screen of the source projection device, (x, y) may be reduced by 1.5 times (that is, divided by 1.5) to obtain the screen coordinates of the point on the source projection device.

It may be understood that the mapping relationship between the screen coordinate system of the destination projection device and the screen coordinate system of the source projection window may alternatively be calculated each time after the projection window is scaled up or down. When coordinate mapping is performed, the mapping relationship is directly used to perform coordinate mapping, to obtain the screen coordinates corresponding to any point on the destination projection device on the source projection device. In addition, the foregoing coordinate conversion process is merely an example, and is not intended to limit this application. A manner for conversion between the screen coordinates on the destination projection device and the screen coordinates on the source projection window is not particularly limited in this embodiment of this application. For ease of description, an example in which the screen display content of the source projection device is displayed in the projection window in 1:1 mode is used for description.

After coordinate mapping is performed, the touch event (namely, the hot zone event) in the hot zone is converted into the screen edge event of the source projection device, so that a complete edge slide event may be obtained and sent to the source projection device.

For example, the coordinate of the touch event obtained through coordinate mapping is (x, y). It is assumed that a screen width of the source projection device is W and a height is H. For different touch slide operations, an event coordinate conversion process of the hot zone event is shown in the following table.

| Type of a touch slide operation | Event coordinate conversion method |
| --- | --- |
| Sliding left inward | Convert the hot zone event (x, y) into a screen edge event (0, y) |
| Sliding right inward | Convert the hot zone event (x, y) into a screen edge event (W, y) |
| Sliding up inward | Convert the hot zone event (x, y) into a screen edge event (x, H) |

For example, the screen coordinates ($x_0$, $y_0$) of o in FIG. 7 is (80, 40), a width of each sub-area in the hot zone is 10, and screen coordinates of a touch event corresponding to a point P in a left-inward slide event on the destination projection device is (75, 140). After coordinate mapping, screen coordinates corresponding to the point P on the source projection device is (75-80, 140-40), that is, (−5, 100). After event coordinate conversion, the point P is changed to P' (0, 100).

It may be understood that, the foregoing description is provided by using a touch slide operation corresponding to a navigation bar function gesture as an example. For another edge slide gesture, a case of sliding down inward may exist. In this case, when event coordinate conversion is performed, the touch event (x, y) may be converted into a screen edge event (x, 0). In addition, the foregoing process of generating the screen edge event is merely an example, and is not intended to limit this application. When the screen edge event is generated, there is no strict time sequence execution relationship between a mapping process corresponding to the formula (1), a window coordinate scaling process, and an event coordinate conversion process. In specific implementation, adjustment can be made as required, as long as a related parameter is adaptively adjusted.

Figure 8:
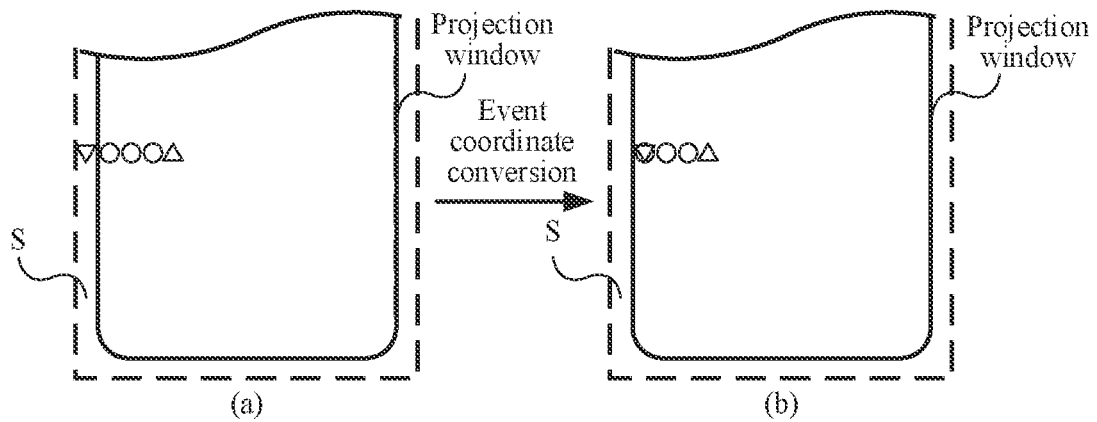
FIG. 8 is a schematic diagram of an event processing result according to an embodiment of this application.

FIG. 8 is a schematic diagram of an event processing result according to an embodiment of this application. As shown in FIG. 8, ∇ represents a down event, ○ represents a move event, and Δ represents an up event. As shown in (a) in FIG. 8, a start touch point (that is, a down event) of a touch slide operation is located in a target area S. As shown in (b) in FIG. 8, after event coordinate conversion, the down event becomes a screen edge event of a projection window (that is, a source projection device).

It may be understood that, in FIG. 8, for ease of describing an event coordinate conversion process, the touch point is enlarged, and only one touch event is included in the target area. In actual application, the target area may include a plurality of touch events.

As shown in (a) and (b) in FIG. 8, for a case in which the start touch point of the touch slide operation is located in the target area, after event coordinate conversion, a touch event in the projection window includes a down event, a move event, and an up event. To be specific, a destination projection device may obtain a complete edge slide event based on a screen edge event obtained through event coordinate conversion and a touch event corresponding to the touch slide operation in the projection window, and send the complete edge slide event to the source projection device.

In another optional implementation, in this embodiment, the destination terminal device may alternatively perform event conversion or compensation based on a touch event whose coordinate is located in the projection window and that is in a touch slide event, to generate a touch down event located at a screen edge of the source projection device, and generate the edge slide event based on the touch down event and the touch event whose coordinate is located in the projection window and that is in the touch slide event.

As shown by an arrow 6 in FIG. 5, a start position of the touch slide operation is located outside the projection window, and the projection window does not include the down event. To obtain the complete edge slide event, the destination terminal device may generate, based on the $1^{st}$ touch event (namely, a move event, referred to as a target event herein) corresponding to the touch slide operation in the projection window, a down event (referred to as a target down event herein) that is located at the screen edge of the source projection device, and obtain the edge slide event based on the target down event and the touch event corresponding to the touch slide operation in the projection window.

To improve continuity between events in the touch slide event, a coordinate of the target down event may be the same as a coordinate of the target event. The target event is located at an edge of the projection window, and is a screen edge event of the source projection device. Correspondingly, the target down event is also a screen edge event of the source projection device.

In specific implementation, one target down event may be used as compensation through event compensation processing. For example, one target down event may be inserted before the target event. To be specific, a timestamp of the target down event is earlier than a timestamp of the target event. Alternatively, one target down event may be generated through event type conversion. To be specific, the target event may be directly converted into the target down event, that is, an event type of the target event is changed from a move event to a down event.

It may be understood that, when the edge slide event is generated, similar to a foregoing process of generating the edge slide event based on a hot zone event, coordinate mapping needs to be performed on each touch event in the projection window. For a specific coordinate mapping manner, refer to the foregoing related descriptions. Details are not described herein again. That the coordinates are the same is that the coordinates of the target down event and the target event in a same coordinate system are the same. When the edge slide event is generated, event type conversion or event compensation may be first performed on the target event to obtain the target down event, and then coordinate mapping may be performed on each touch event in the projection window. Alternatively, coordinate mapping may be first performed on each touch event in the projection window, and then the target down event is generated based on the target event thereof.

Figure 9:
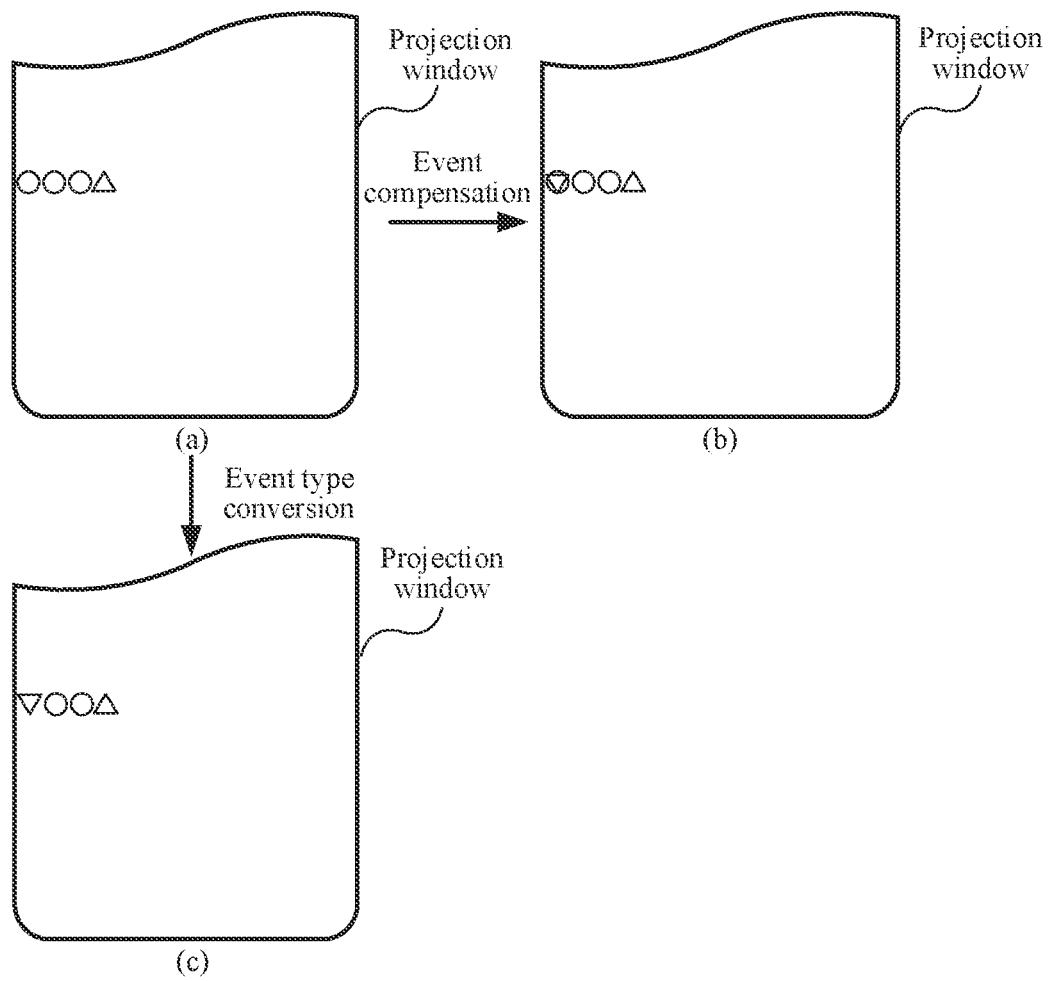
FIG. 9 is a schematic diagram of another event processing result according to an embodiment of this application.

FIG. 9 is a schematic diagram of another event processing result according to an embodiment of this application. In FIG. 9, a touch event representation manner similar to that in FIG. 8 is still used. ∇ represents a down event, ○ represents a move event, and Δ represents an up event. As shown in (a) in FIG. 9, a start touch point of a touch slide operation is located outside a projection window, and the $1^{st}$ touch event located in the projection window is a move event. As shown in (b) in FIG. 9, Ether event compensation processing, one down event whose coordinate is the same as a coordinate of the move event is added. As shown in (c) in FIG. 9, after event type conversion, the $1^{st}$ move event in the projection window becomes a down event.

Figure 10A:
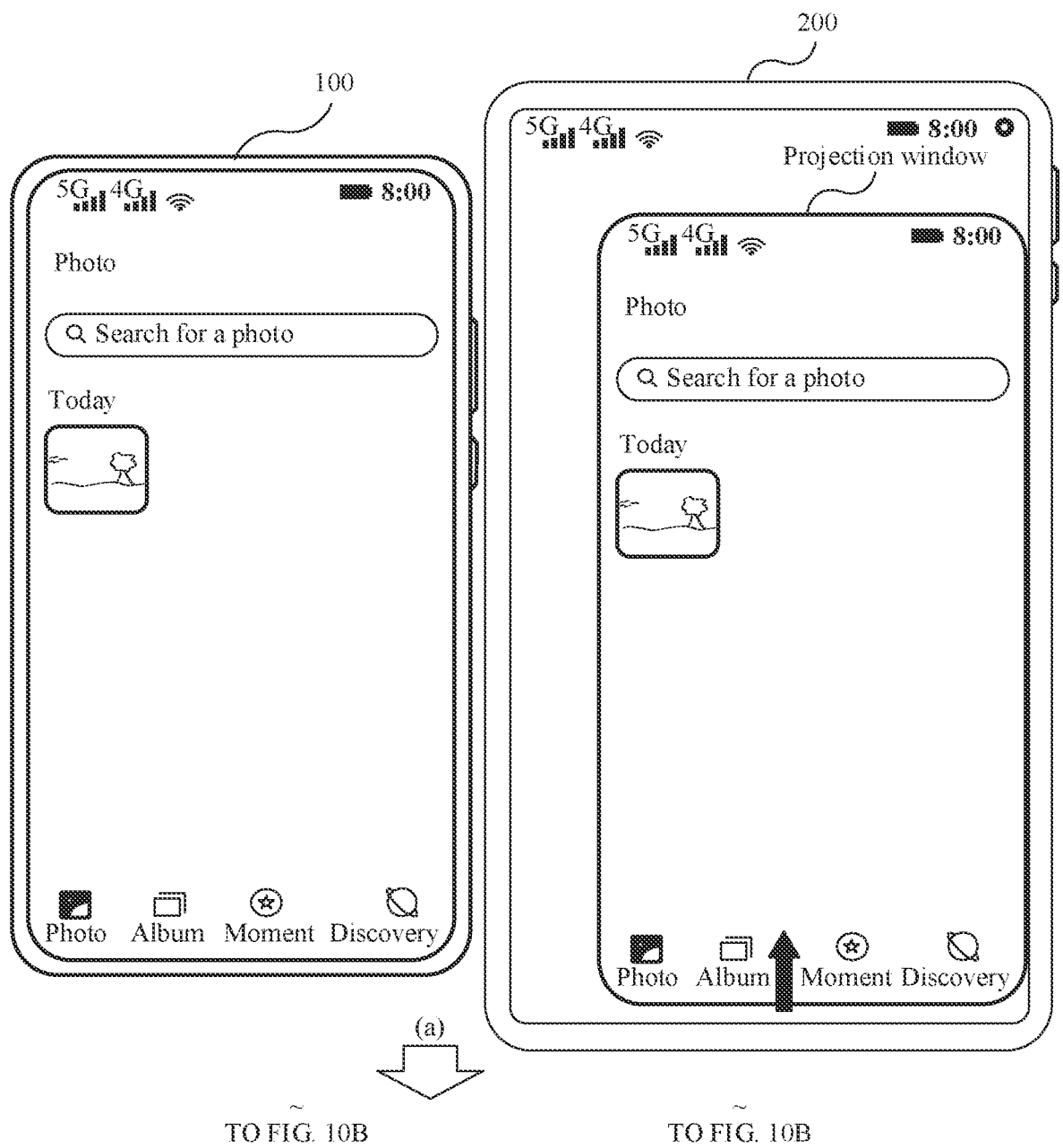
FIG. 10A and FIG. 10B are a schematic diagram of a device control result according to an embodiment of this application.
Figure 10B:
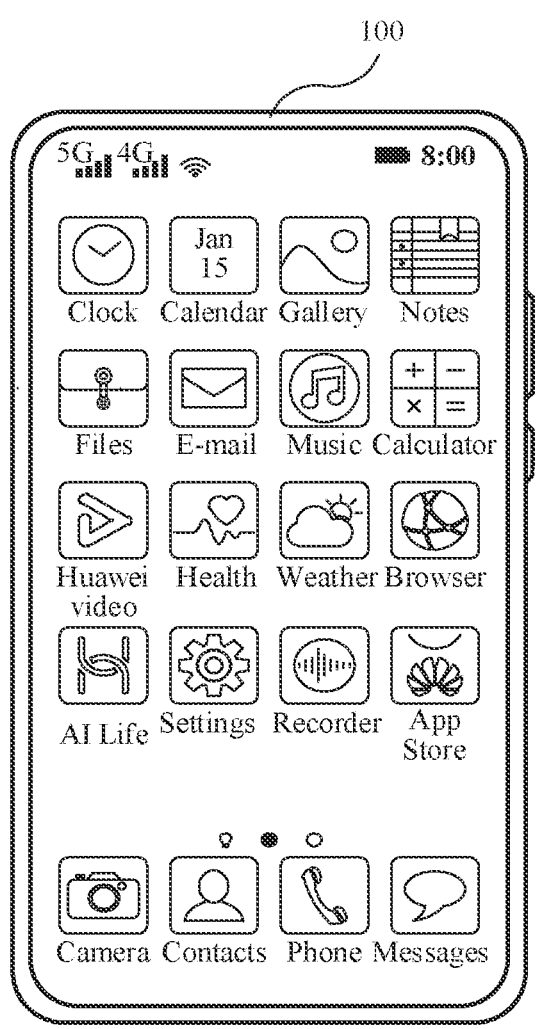
Figure 10B:
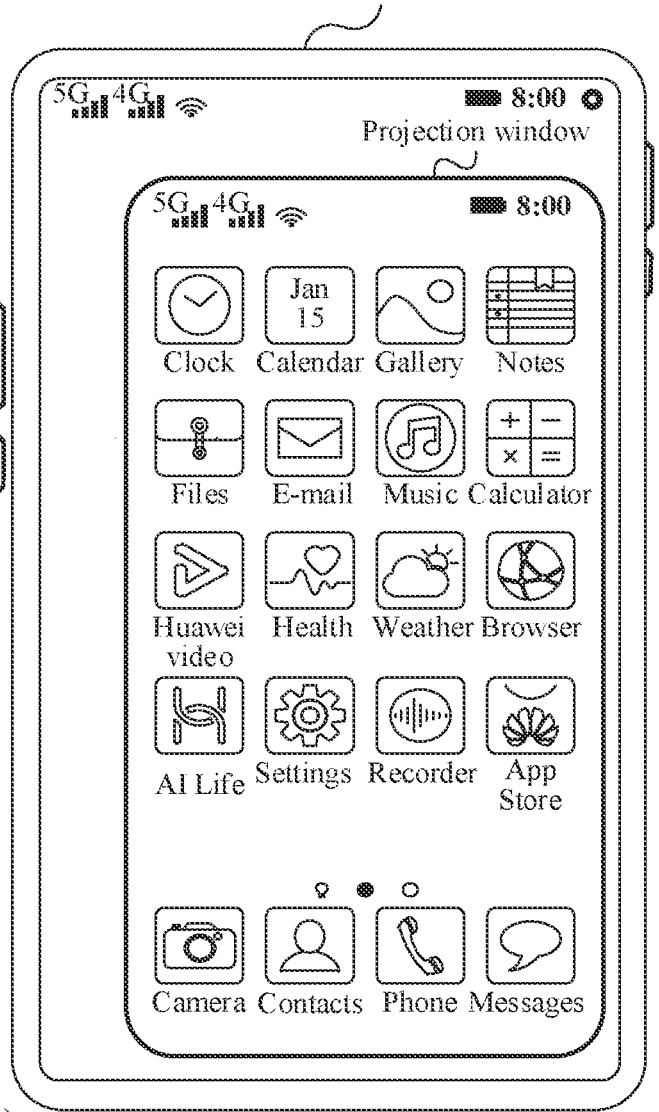
Figure 11:
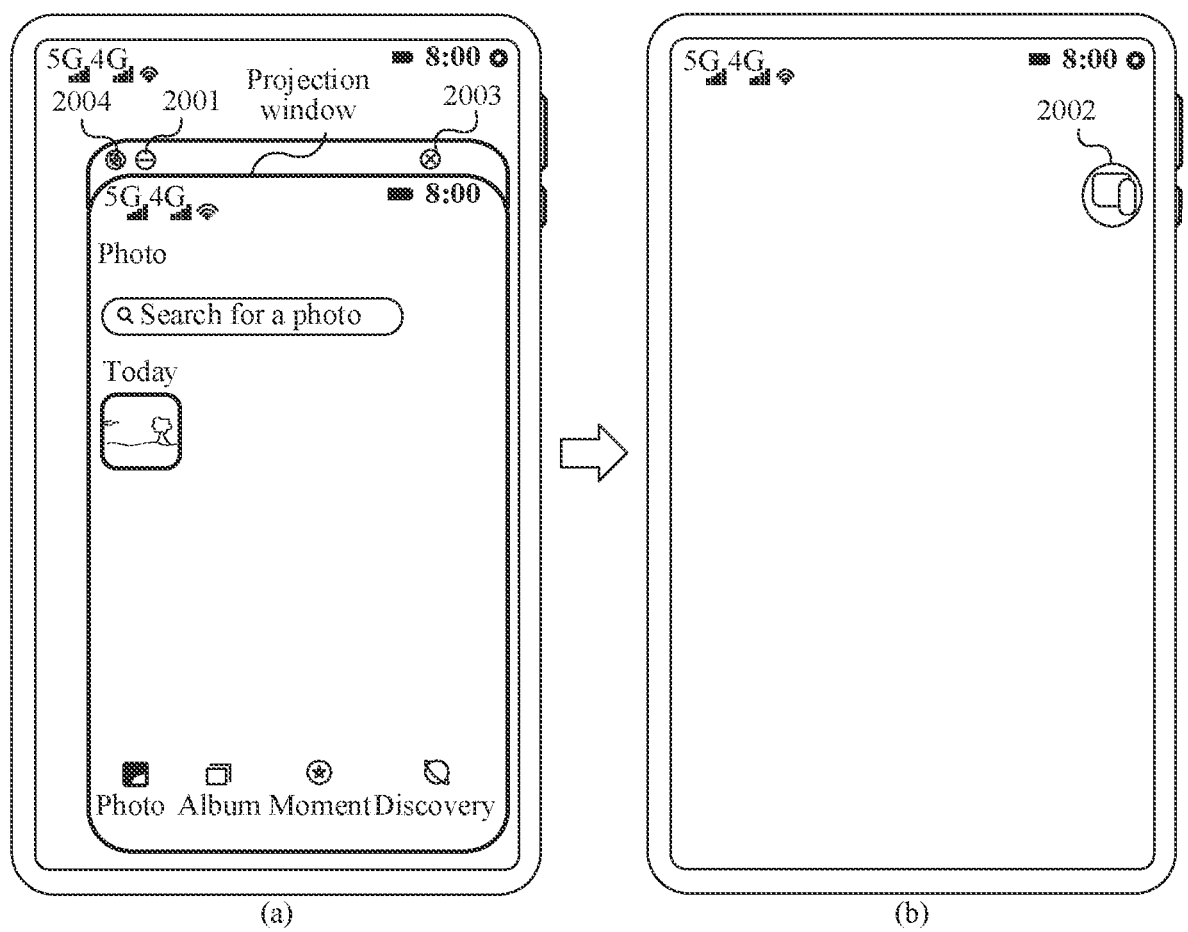
FIG. 11 to FIG. 13 are schematic diagrams of some user interfaces according to embodiments of this application.

An example in which a user triggers a gesture of returning to a home screen by using the touch slide operation is used. When a gesture navigation mode is enabled on a source projection device 100, as shown in (a) in FIG. 10A and FIG. 10B, the user inputs, on a destination projection device 200, a touch slide operation (referring to a black arrow in the figure) of sliding from outside the projection window to inside the projection window. In a current related reverse control solution, the destination projection device 200 feeds back a touch event in the projection window to the source projection device 100 after coordinate mapping, and these events do not include the down event. Correspondingly, the source projection device 100 receives one incomplete edge slide event, and therefore an edge slide gesture cannot be triggered, that is, a reverse control operation of the user fails. However, in this embodiment, the destination projection device 200 may use a target area as a hot zone, and perform event conversion or compensation processing on an event in the hot zone or the projection window to generate an edge slide event including a target down event. Correspondingly, the source projection device 100 receives one complete edge slide event. Therefore, as shown in (b) in FIG. 10A and FIG. 10B, the gesture of returning to the home screen may be successfully triggered, and an operation of returning to the home screen may be performed. When updating screen display content, the source projection device 100 may send updated screen display content to the destination projection device 200, and the destination projection device 200 correspondingly updates screen display content displayed in the projection window Considering that the user may slide to the projection window when performing a touch slide operation on screen display content of the destination projection device, to avoid a conflict with a touch slide operation performed on the projection window, in this embodiment, the destination projection device may provide a projection window moving function. The user may move the projection window when needing to perform a touch slide operation on screen display content near the projection window. For example, the user may move the projection window by dragging a window edge area of the projection window. In addition, the destination projection device may also provide a function of minimizing the projection window. For example, as shown in (a) in FIG. 11, a function bar may be added to the projection window, and a minimizing control 2001 is provided in the function bar. The user may tap the minimizing control 2001 to minimize the projection window. As shown in (b) in FIG. 11, the destination projection device may display a minimized window 2002 corresponding to the projection window near a screen edge, and the user may resume displaying the projection window by tapping the minimized window 2002. In addition, the function bar may further provide other controls such as a close control 2003 configured to close the projection window and a scaling control 2004 to be used by the user to scale up or down the projection window To help the user better understand an operation area of the foregoing projection reverse control, in this embodiment, the destination projection device may perform a related function description. The function description may be provided in an APP (for example, a "Tips" APP provided by Huawei) for describing a device function.

Figure 12:
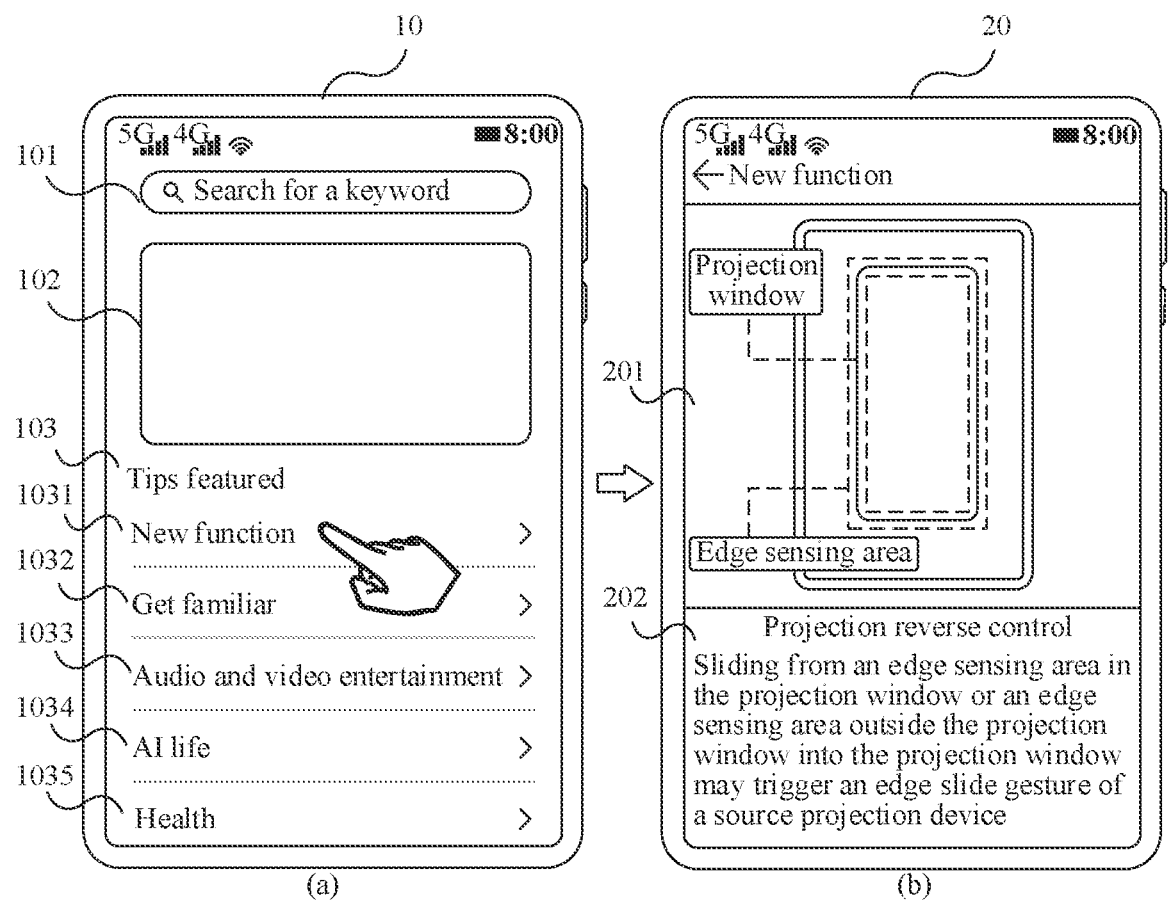

FIG. 12 is a schematic diagram of another user interface according to an embodiment of this application. As shown in (a) in FIG. 12, a "Tips" APP is used as an example. After a user starts the "Tips" APP a corresponding user interface 10 may include a search box 101, a function recommendation bar 102, and a Tips featured bar 103. The search box 101 is used by the user to search for a function that the user wants to know. The function recommendation bar 102 may recommend some new functions, popular functions, and the like. The Tips featured bar 103 may provide various category options of the Tips, for example, a "new function" option 1031, a "get familiar" option 1032, a "video and audio entertainment" option 1033, an "AI life" option 1034, and a "health" option 1035 shown in the figure.

A description of projection reverse control may be located under one of the categories of the Tips featured bar 103, for example, may be located under a category corresponding to the "new function" option 1031. As shown in (a) and (b) in FIG. 12, the user may tap the "new function" option 1031 to start a corresponding new function interface 20 to view the description of the projection reverse control.

As shown in (b) in FIG. 12, the new function interface 20 may include a function demonstration bar 201 and a function description bar 202. In the function demonstration bar 201, a projection reverse control operation and a related edge sensing area may be described in a short video manner. For example, as shown in (b) in FIG. 12, an edge sensing area (including the foregoing area B and area S) corresponding to an edge slide gesture on a destination projection device may be shown, so that the user can more intuitively understand a reverse control function of the edge slide gesture. In the function description bar 202, the reverse control function of the edge slide gesture may be described in a text manner, for example, an example of a text shown in (b) in FIG. 12: "Sliding from an edge sensing area in a projection window or an edge sensing area outside the projection window into the projection window may trigger an edge slide gesture of a source projection device".

The "Tips" APP can also provide a card corresponding to the description of the projection reverse control in the function recommendation bar 103. The user can tap the card to view the description of the projection reverse control. In addition, the user may alternatively search the search bar 102 for the description of the projection reverse control.

It may be understood that the foregoing interface is merely an example for description, elements in the interface may be adjusted as required, and interfaces corresponding to the "Tips" APP on different types of terminal devices may be different.

To meet different requirements of the user and improve user experience, in this embodiment, the terminal device may also provide an edge sensing area setting function corresponding to the area S. Specifically, the function may be provided in one option of a system setting function. For example, as shown in (a) in FIG. 13, a projection reverse control option 301 may be added to an auxiliary function interface 30 corresponding to an "auxiliary function" option. The user may tap the projection reverse control option 301 to enter a corresponding projection reverse control setting interface 40 (referring to (b) in FIG. 13), and set the edge sensing area in the interface. To facilitate the user to understand the setting function, the foregoing description of the projection reverse control may be provided in the projection reverse control setting interface 40. To be specific, the user may understand function description of a projection reverse control function in the foregoing "Tips" APP, or may learn function description of a projection reverse control function in the edge sensing area setting function.

Figure 13:
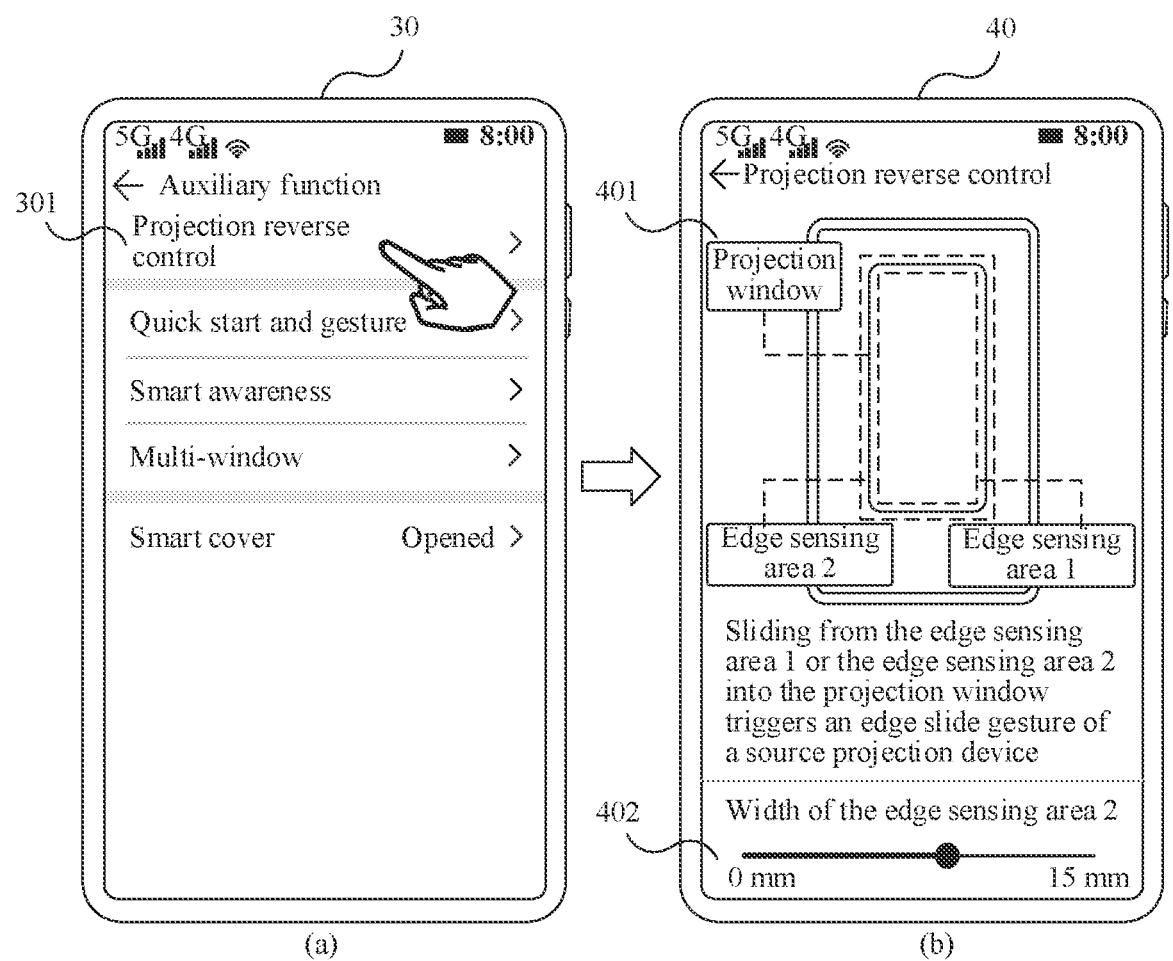

As shown in (b) in FIG. 13, the projection reverse control setting interface 40 may include a function description bar 401 and a setting bar 402. Content displayed in the function description bar 401 is similar to content shown in (b) in FIG. 12. The projection reverse control function may be briefly introduced in a manner of a picture and a text. For example, an edge sensing area 1 corresponding to the area B and an edge sensing area 2 corresponding to the area S may be shown in the picture. The text may be "Sliding from the edge sensing area 1 or the edge sensing area 2 into the projection window triggers the edge slide gesture of the source projection device". The setting bar 402 may provide a related control for the user to set a width of the edge sensing area 2 (that is, the area S). The control may be a sliding control shown in the figure, and two ends of the control may display a sliding range (an example of the range herein is 0 mm to 15 mm). The control may alternatively include single-choice controls corresponding to a plurality of preset area widths, or may be another type of control such as a text control, which may be specifically set as required. This is not particularly limited in this embodiment.

The following describes the device control process in the second case.

In the second case, the start position of the touch slide operation is located in the projection window.

When the start position of the touch slide operation is located in the projection window, the destination projection device may perform coordinate mapping on a touch event corresponding to the touch slide operation in the projection window to obtain a touch slide event, and then send the touch slide event to the source projection device.

As shown in FIG. 2, when the user performs the touch slide operation on the projection window on the destination projection device, a case shown by an arrow 5 is likely to occur. To be specific, the start position of the touch slide operation is located outside a window edge area. Correspondingly, a start position of the touch slide event received by the source projection device from the destination projection device is located outside a screen edge area. In this way, the edge slide gesture is not triggered.

To improve a success rate of triggering, by the user, the edge slide gesture of the source projection device on the destination projection device, in this embodiment, when processing the touch slide event sent by the destination projection device, the source projection device may detect the edge slide gesture by using a larger hot zone (that is, the screen edge area).

Figure 14:
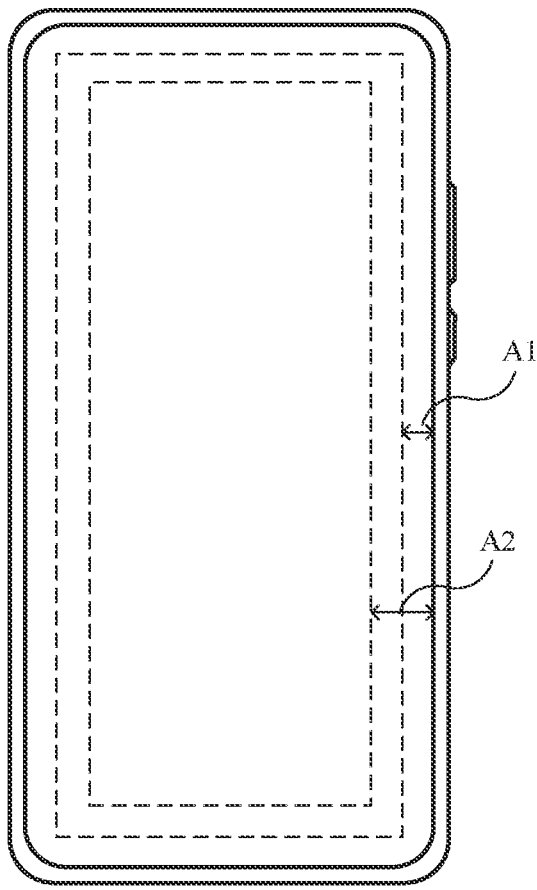
FIG. 14 is a schematic diagram of a screen edge area according to an embodiment of this application.

FIG. 14 is a schematic diagram of a screen edge area according to an embodiment of this application. As shown in FIG. 14, a source projection device may generate a screen edge area (referred to as a first area A1 herein) when being powered on. After a projection connection is established, a screen edge area (referred to as a second area A2 herein) may be further generated. Both the first area A1 and the second area A2 are areas formed by extending inward from a screen edge of the source projection device, and coverage of the second area A2 is larger than coverage of the first area A1. Similar to the first area A1, the second area A2 may include a plurality of areas in four sub-areas: upper, lower, left, and right. A width of each sub-area may be a multiple, for example, twice, of a width of a corresponding sub-area in the first area A1.

Figure 15:
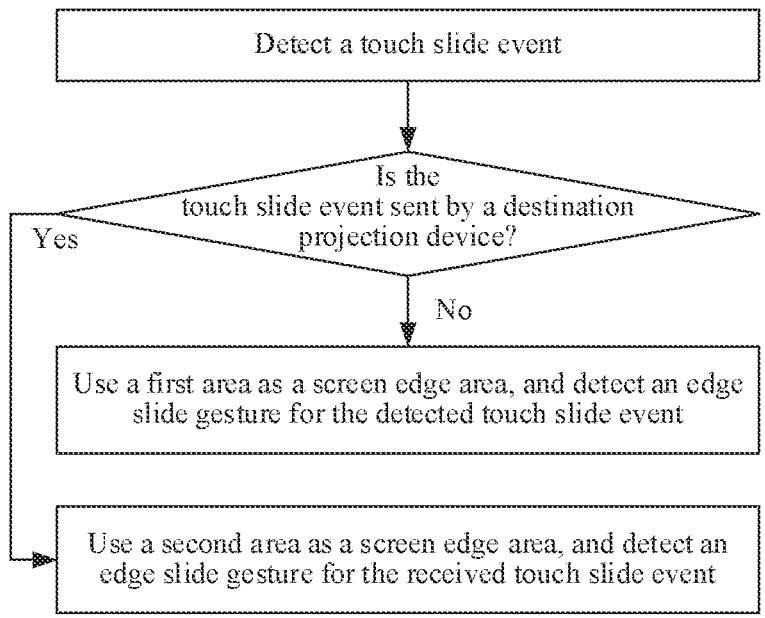
FIG. 15 is a schematic diagram of another event processing process according to an embodiment of this application.

When processing a touch slide event, as shown in FIG. 15, the source projection device may determine whether the touch slide event is sent by a destination projection device after the touch slide event is detected. If the touch slide event is sent by the destination projection device, the second area may be used as a screen edge area, and an edge slide gesture is detected for the received touch slide event. If the touch slide event is not sent by the destination projection device, that is, the touch slide event is triggered by a user on the source projection device, the first area may be used as a screen edge area, and an edge slide gesture is detected for the detected touch slide event.

In other words, for the touch slide event triggered by the user on the source projection device and the touch slide event sent by the destination projection device, when the source projection device detects the edge slide gesture, a difference lies only in that ranges of the used screen edge areas are different, but other detection processes are the same. For any touch slide event, if the edge slide gesture is detected, the source projection device may perform a control function corresponding to the detected edge slide gesture.

In specific implementation, a mark may be added to the touch slide event sent by the destination projection device, and the source projection device may determine a source of the touch slide event based on the mark.

Figure 16A:
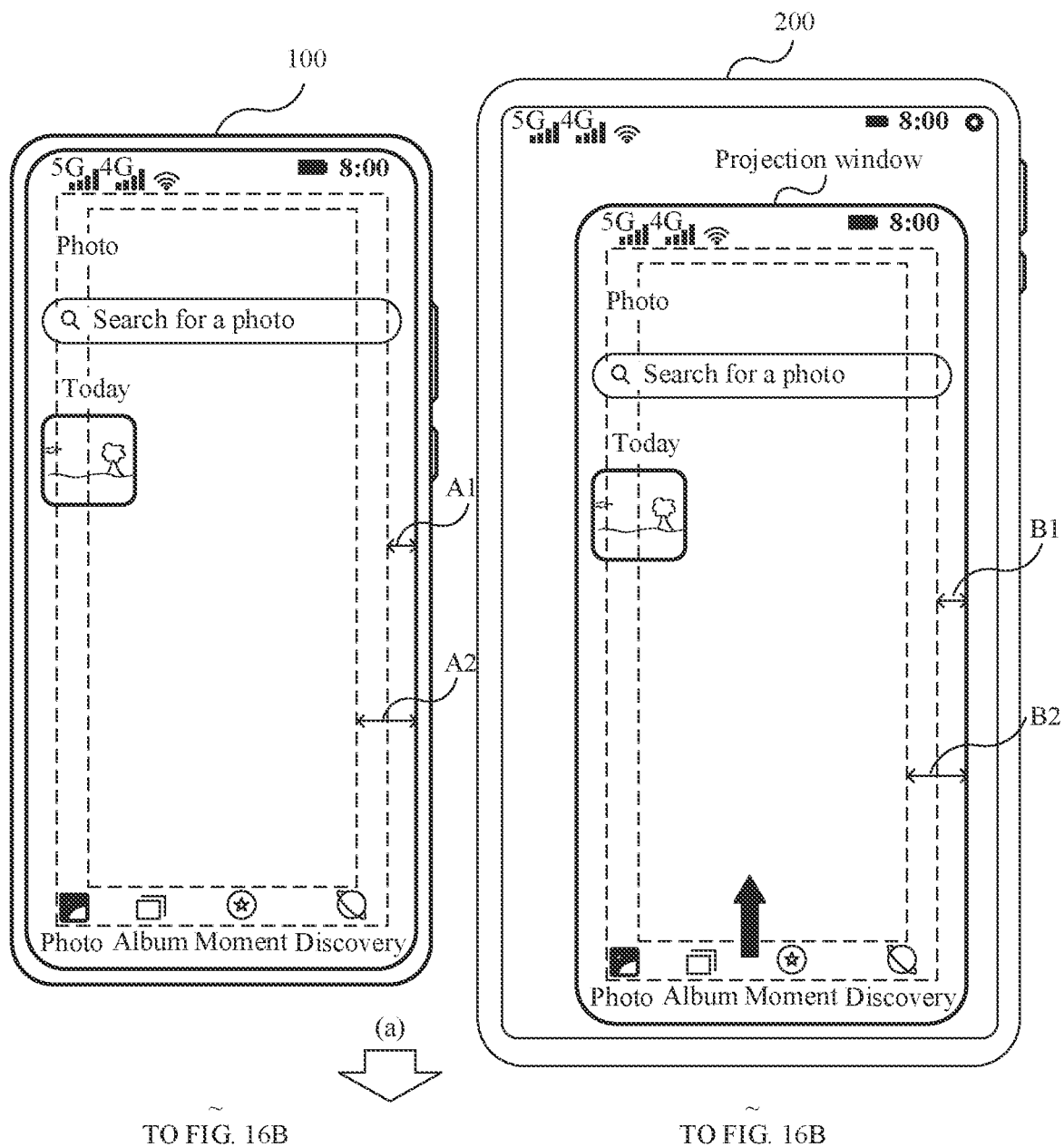
FIG. 16A and FIG. 16B are a schematic diagram of another device control result according to an embodiment of this application.
Figure 16B:
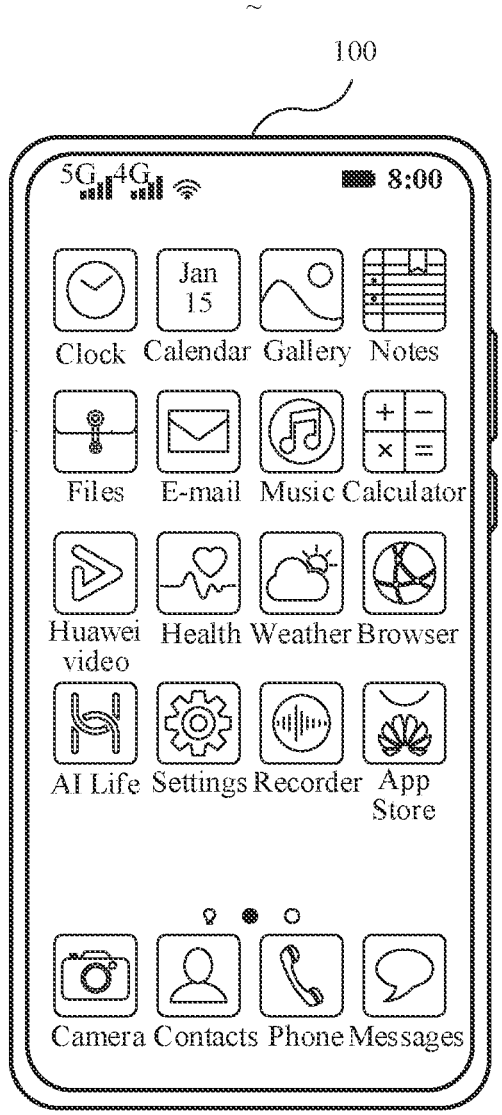
Figure 16B:
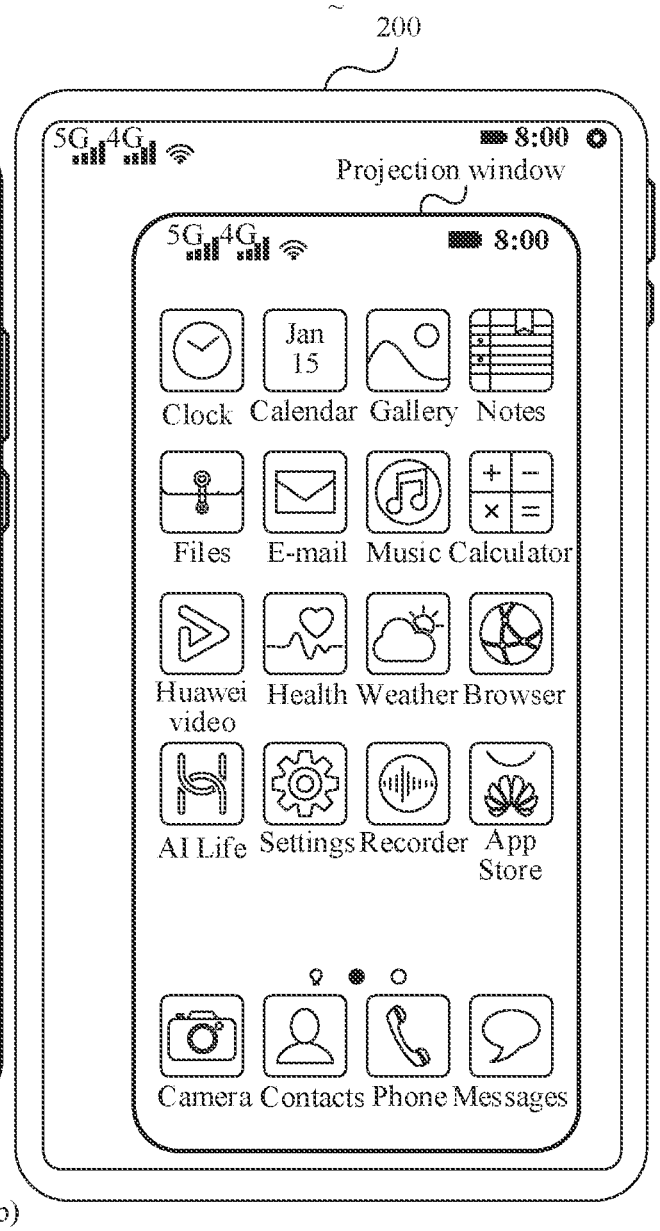

An example in which the user triggers a gesture of returning to a home screen by using a touch slide operation is still used. As shown in (a) in FIG. 16A and FIG. 16B, window edge areas that are on a projection window and that correspond to a first area A1 and a second area A2 of a source projection device 200 are respectively a third area B1 and a fourth area B2. The user inputs, on a destination projection device 200, a touch slide operation (referring to s black arrow in the figure) of sliding from the fourth area B2 outside the third area B1 to the projection window. In a current related reverse control solution, after the destination projection device 200 feeds back a touch slide event corresponding to the touch slide operation to the source projection device 200, the source projection device 200 cannot trigger an edge slide gesture because a start position of the touch slide event is not in the first area A1, that is, a reverse control operation of the user fails. However, in this embodiment, the source projection device 200 performs edge gesture detection on the touch slide event based on the second area A2. A start position of the touch slide operation is located in the fourth area B2, and a start position of the touch slide event corresponding to the touch slide operation is located in the second area A2. Therefore, the source projection device 200 may successfully trigger the gesture of returning to the home screen, to perform an operation of returning to the home screen as shown in (b) in FIG. 16A and FIG. 16B. When updating screen display content, the source projection device 200 may send updated screen display content to the destination projection device 200, and the destination projection device 200 correspondingly updates screen display content displayed in the projection window.

To be specific, for a same edge slide gesture, the user may slide from the first area A1 on the source projection device as required to trigger the edge slide gesture; and on the destination projection device, the user may slide from the fourth area B2 corresponding to the second area A2 as required to trigger the edge slide gesture. In this way, the user can conveniently perform a reverse control operation, and reliability of the reverse control operation is improved.

Similarly, to help the user better understand an operation area of the foregoing projection reverse control, in this embodiment, the source projection device may perform a related function description. An example in which a description of the projection reverse control is provided in a new function interface of a "Tips" APP is still used for description.

Figure 17:
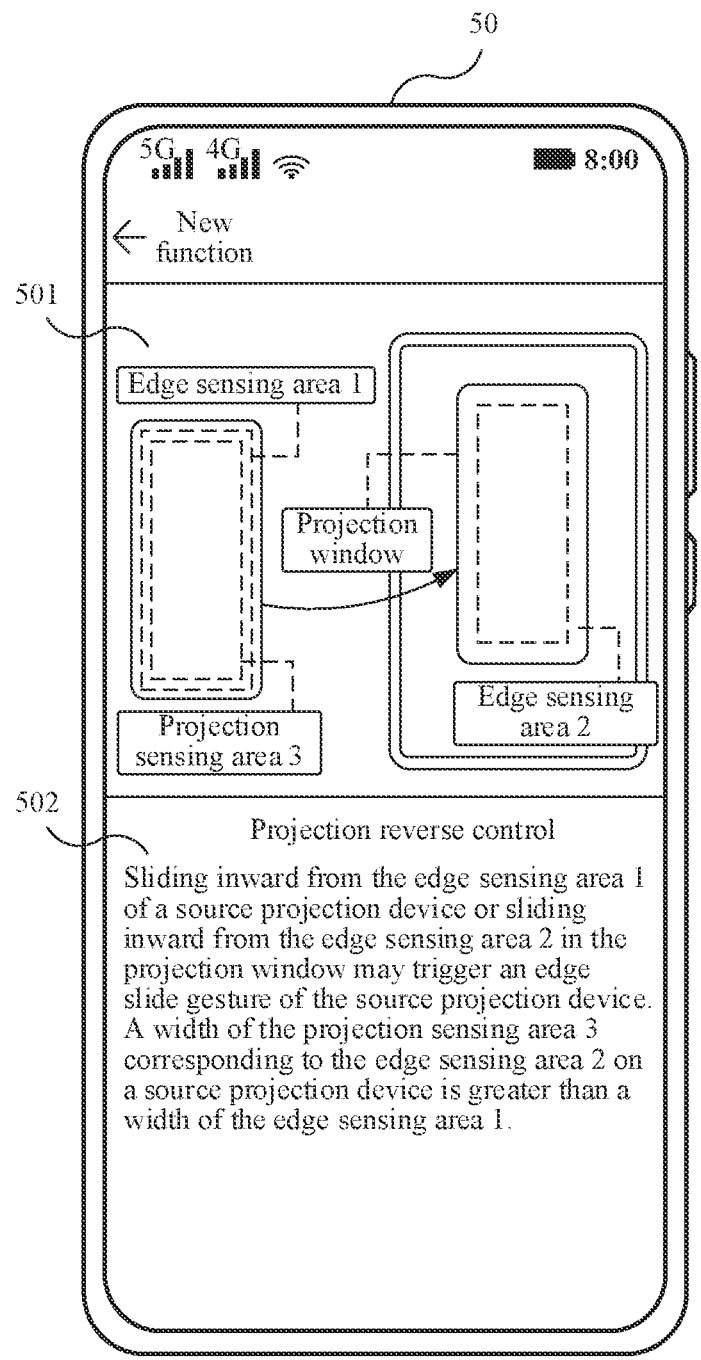
FIG. 17 and FIG. 18 are schematic diagrams of other some user interfaces according to embodiments of this application.

FIG. 17 is a schematic diagram of a new function interface 50 on a source projection device. The interface shown in FIG. 17 is similar to the interface shown in (b) in FIG. 12, except that content shown in a function demonstration bar and a function description bar is different. As shown in FIG. 17, the function demonstration bar 501 may respectively show sensing areas corresponding to edge slide gestures of the source projection device and a destination projection device. An example of a function description text in the function description bar 502 may be "Sliding inward from an edge sensing area 1 of the source projection device or sliding inward from an edge sensing area 2 in a projection window may trigger an edge slide gesture of the source projection device. A width of a projection sensing area 3 corresponding to the edge sensing area 2 on the source projection device is greater than a width of the edge sensing area 1". The edge sensing area 1 is the foregoing area A1, the edge sensing area 2 is the foregoing area B2, and the projection sensing area 3 is the foregoing area A2.

Figure 18:
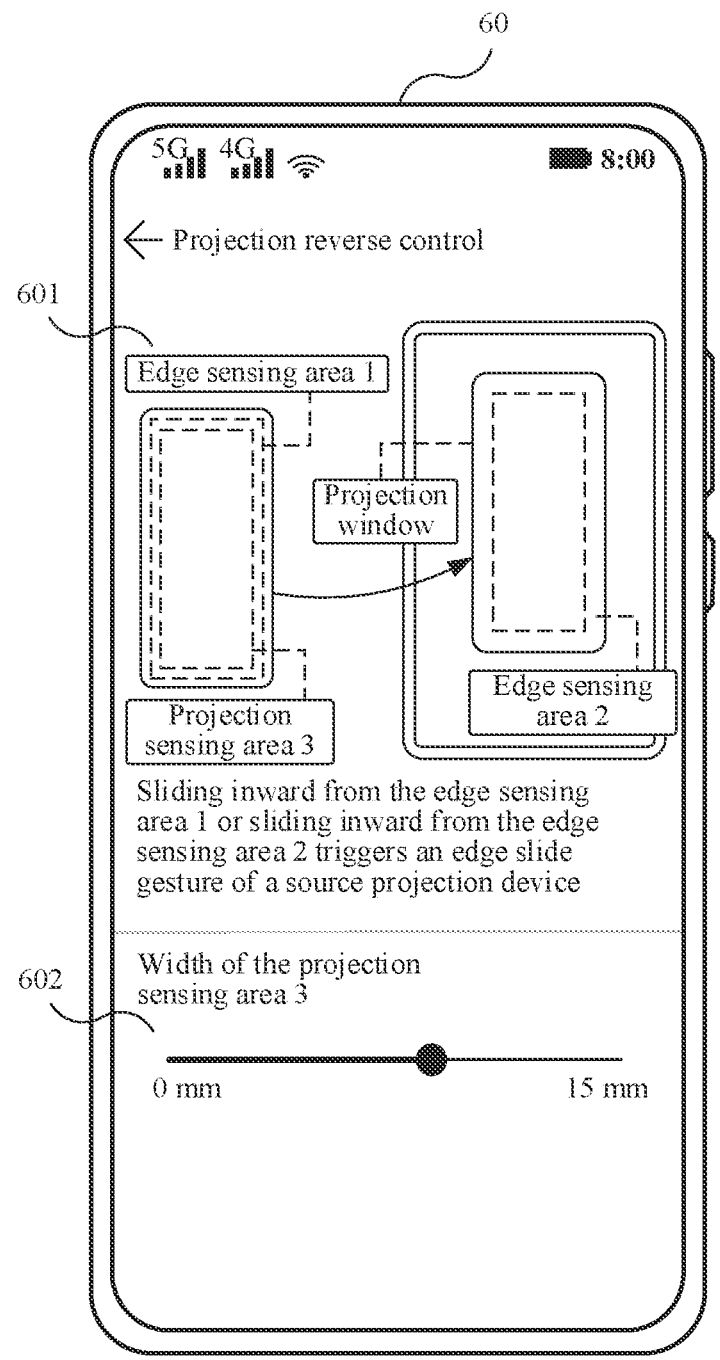

Similarly, the source projection device may also provide a projection sensing area setting function. A specific setting manner is similar to a setting manner of an edge sensing area in FIG. 13. FIG. 18 is a schematic diagram of a projection reverse control interface 60 on a source projection device. The interface shown in FIG. 18 is similar to the interface shown in (b) in FIG. 13, except that content shown in a function description bar and a setting bar is different. As shown in FIG. 18, content displayed in the function description bar 601 is similar to content shown in FIG. 17. A projection reverse control function may be briefly described in a manner of a picture and a text. For example, an edge sensing area 1 corresponding to an area A1, an edge sensing area 2 corresponding to an area B2, and a projection sensing area 3 corresponding to an area A2 may be shown in the picture. The text may be "Sliding inward from the edge sensing area 1 or sliding inward from the edge sensing area 2, to trigger an edge slide gesture of the source projection device". The setting bar 602 may provide a related control for a user to set a width of the area B2. For a specific setting manner of the control, refer to related descriptions in FIG. 13. Details are not described herein again.

According to the device control method provided in this embodiment, the destination projection device may convert a touch slide event generated by a touch slide operation performed by the user by sliding from outside the projection window to inside the projection window into an edge slide event of the source projection window. In this way, the source projection device may detect the edge slide gesture based on a complete edge slide event, so that the success rate of triggering, by the user, the edge slide gesture of the source projection device on the destination projection device can be improved, thereby improving the reliability of the reverse control operation and user experience. In addition, the source projection device uses the first area as the screen edge area, and detects the edge slide gesture for the touch slide event triggered by the user on the source projection device; and uses the second area larger than the first area as the screen edge area, and detects the edge slide gesture for the received touch slide event. In this way, the success rate of triggering, by the user, the edge slide gesture of the source projection device on the destination projection device can be improved, thereby improving the reliability of the reverse control operation and user experience.

Based on a same invention concept, in an implementation of the foregoing method, an embodiment of this application provides a device control apparatus. The apparatus embodiment corresponds to the foregoing method embodiment. For ease of reading, details in the foregoing method embodiment are not described one by one in this apparatus embodiment. However, it should be clear that the apparatus in this embodiment can correspondingly implement all content in the foregoing method embodiment.

Figure 19:
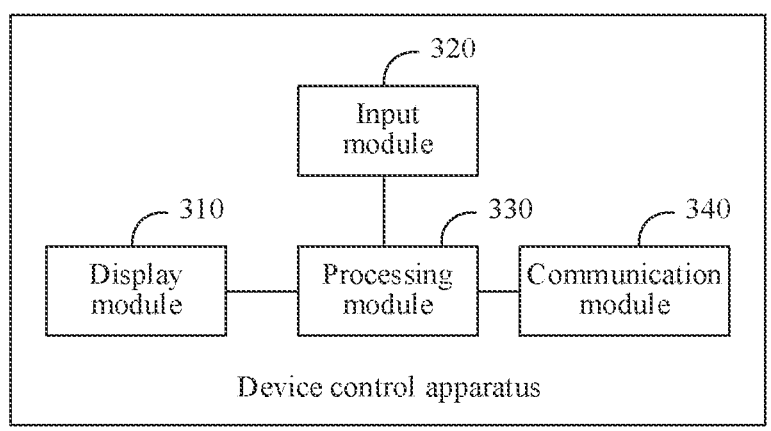
FIG. 19 is a schematic diagram of a structure of a device control apparatus according to an embodiment of this application.

FIG. 19 is a schematic diagram of a structure of a device control apparatus according to an embodiment of this application. As shown in FIG. 19, the apparatus provided in this embodiment may include a display module 310, an input module 320, a processing module 330, and a communication module 340.

The display module 310 is configured to support a mobile terminal in performing an interface display operation in the foregoing embodiments and/or another process of the technology described in this specification. The display unit may be a touchscreen, other hardware, or a combination of hardware and software.

The input module 320 is configured to receive an input of a user on a display interface of the mobile terminal, for example, a touch input, a voice input, or a gesture input. The input module is configured to support the terminal in performing a process in which a source projection device and/or a destination projection device receive/receives a touch slide operation input by the user in the foregoing embodiments and/or another process of the technology described in this specification. The input module may be a touchscreen, other hardware, or a combination of hardware and software.

The processing module 330 is configured to support the mobile terminal in performing an event processing operation of the source projection device and/or the destination projection device in the foregoing embodiments and/or another process of the technology described in this specification.

The communication module 340 is configured to support the mobile terminal in performing an operation related to a communication process between the source projection device and the destination projection device in the foregoing embodiments and/or another process of the technology described in this specification.

The apparatus provided in this embodiment can perform the foregoing method embodiments. An implementation principle and a technical effect are similar and are not described herein again.

It may be clearly understood by a person skilled in the art that, for the purpose of convenient and brief description, division of the foregoing function units or modules is used as an example for illustration. In actual application, the foregoing functions can be allocated to different function units or modules for implementation based on a requirement, that is, an inner structure of the apparatus is divided into different function units or modules to implement all or some of the functions described above. The function units or modules in embodiments may be integrated into one processing unit, or each of the units may exist alone physically, or two or more units may be integrated into one unit. The integrated unit may be implemented in a form of hardware, or may be implemented in a form of a software function unit. In addition, specific names of the function units or modules are merely provided for ease of distinguishing from each other, but are not intended to limit the protection scope of this application. For a specific working process of the units or modules in the foregoing system, refer to a corresponding process in the foregoing method embodiments. Details are not described herein again.

An embodiment of this application further provides a computer-readable storage medium, storing a computer program. When the computer program is executed by a processor, the method in the foregoing method embodiments is implemented.

An embodiment of this application further provides a computer program product. When the computer program product runs on a terminal device, the terminal device is enabled to perform the method in the foregoing method embodiments.

An embodiment of this application further provides a chip system, including a processor. The processor is coupled to a memory, and the processor executes a computer program stored in the memory, to implement the method in the foregoing method embodiments. The chip system may be a single chip or a chip module including a plurality of chips.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted through the computer-readable storage medium. The computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid state drive (Solid State Drive, SSD)), or the like.

A person of ordinary skill in the art may understand that all or some of the procedures of the methods in embodiments may be implemented by a computer program instructing related hardware. The program may be stored in the computer-readable storage medium. When the program is executed, the procedures in the method embodiments may be included. The foregoing storage medium may include any medium that can store program code, such as a ROM, a random access memory RAM, a magnetic disk, or an optical disc.

In the foregoing embodiments, the description of each embodiment has respective focuses. For a part that is not described in detail or recorded in an embodiment, refer to related descriptions in another embodiment.

In embodiments provided in this application, it should be understood that the disclosed apparatus/device and method may be implemented in other manners. For example, the described apparatus/device embodiment is merely an example. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

It should be understood that, when used in this specification and the appended claims of this application, the term "include" indicates presence of the described features, integers, steps, operations, elements, and/or components, but does not exclude presence or addition of one or more other features, integers, steps, operations, elements, components, and/or their combinations.

It should also be understood that the term "and/ or" used in this specification and the appended claims of this application refers to any combination and all possible combinations of one or more associated listed items, and includes these combinations.

As used in this specification and the appended claims of this application, the term "if" may be interpreted as "when", "once", "in response to determining", or "in response to detecting" depending on the context. Similarly, depending on the context, the phrase "if it is determined that" or "if (a described condition or event) is detected" may be interpreted as a meaning of "once it is determined that", "in response to determining", "once (the described condition or event) is detected", or "in response to detecting (the described condition or event)" depending on the context.

In addition, in the descriptions of this specification and the appended claims of this application, the terms "first", "second", "third", and the like are merely intended for distinguishing and description, but shall not be understood as an indication or an implication of relative importance.

Reference to "an embodiment", "some embodiments", or the like described in this specification of this application indicates that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have", and their variants all mean "including but not limited to", unless otherwise specifically emphasized in another manner.

Finally, it should be noted that the foregoing embodiments are merely intended for describing the technical solutions of this application, but not tor limiting this application. Although this application is described in detail with reference to the foregoing embodiments, a person of ordinary skill in the art should understand that they may still make modifications to the technical solutions recorded in the foregoing embodiments or make equivalent replacements to some or all technical features thereof, without departing from the scope of the technical solutions of embodiments of this application.

What is claimed is:

1. A method implemented by a system, wherein the method comprises:
    displaying, by a destination projection device of the system, a projection window of a source projection device of the system;
    receiving, by the destination projection device, a first touch slide operation performed by a user by sliding from outside the projection window to inside the projection window;
    generating, by the destination projection device, a first touch slide event in response to the first touch slide operation; and
    when a start touch point of the first touch slide operation is located in a target area:
        converting, by the destination projection device, the first touch slide event into an edge slide event of the source projection device;
        sending, by the destination projection device, the edge slide event to the source projection device, wherein the target area is formed by extending a preset distance outward from an edge of the projection window, and wherein the target area is set by the destination projection device; and updating, by the source projection device, screen display content based on the edge slide event.

2. The method of claim 1, wherein the first touch slide event comprises a series of touch events, and wherein converting the first touch slide event comprises:

converting, by the destination projection device, a first touch event comprising a first coordinate that is located in the target area and that is in the first touch slide event into a screen edge event of the source projection device; and generating, by the destination projection device, the edge slide event based on the screen edge event and a second touch event comprising a second coordinate that is located in the projection window and that is in the first touch slide event.

3. The method of claim 1, wherein the first touch slide event comprises a series of touch events, and wherein converting the first touch slide event comprises:

generating, by the destination projection device, a touch down event based on a target event, wherein the target event is a $1^{st}$ touch event that is located in the projection window and that is based on the first touch slide operation, and wherein the touch down event is a screen edge event of the source projection device; and generating, by the destination projection device, the edge slide event based on the touch down event and a $2^{nd}$ touch event that is located in the projection window and that is in the first touch slide event.

4. The method of claim 3, further comprising inserting, by the destination projection device, the touch down event before the target event, wherein a first coordinate of the touch down event is the same as a second coordinate of the target event.

5. The method of claim 3, wherein generating a touch down event comprises converting, by the destination projection device, the target event into the touch down event.

6. The method of claim 1, further comprising:

identifying, by the destination projection device, that the start touch point is located outside the target area; and updating, by the destination projection device, the screen display content of the destination projection device in response to the first touch slide event.

7. The method of claim 1, further comprising:

receiving, by the source projection device, a second touch slide operation performed by the user on the source projection device;

in response to the second touch slide operation:
setting, by the source projection device, a first area as a first screen edge area; and
detecting, by the source projection device, an edgea first edge slide gesture for a second touch slide event that is based on the second touch slide operation;

receiving, by the destination projection device, a third touch slide operation performed by the user by sliding inward from the projection window;

in response to the third touch slide operation:
generating, by the destination projection device, a third touch slide event corresponding to the source projection device; and
sending, by the destination projection device, the third touch slide event to the source projection device;

after receiving the third touch slide event:
using, by the source projection device, a second area as a second screen edge area, wherein both the first area and the second area extend inward from a screen edge of the source projection device, and wherein coverage of the second area is larger than coverage of the first area; and
detecting a second edge slide gesture for the third touch slide event;

executing, by the source projection device in response to the second edge slide gesture, a control function corresponding to the second edge slide gesture; and updating, by the source projection device, the screen display content.

8. The method of claim 7, wherein the second edge slide gesture is a first gesture of returning to a previous level, a second gesture of returning to a home screen, or a third gesture for a recent task list.

9. The method of claim 1, further comprising:

sending, by the source projection device, the screen display content to the destination projection device; and displaying, by the destination projection device, the screen display content in the projection window after receiving the screen display content.

10. A method implemented by a destination projection device, wherein the method comprises:

displaying a projection window of a source projection device;

setting a target area formed by extending a preset distance outward from an edge of the projection window;

receiving a touch slide operation performed by a user by sliding from outside the projection window to inside the projection window;

generating a touch slide event in response to the touch slide operation; and when a start touch point of the touch slide operation is located in the target area:
converting the touch slide event into an edge slide event of the source projection device; and
sending the edge slide event to the source projection device.

11. The method of claim 10, wherein the touch slide event comprises a series of touch events, and wherein the method further comprises:

converting a first touch event comprising a first coordinate that is located in the target area and that is in the touch slide event into a screen edge event of the source projection device; and generating the edge slide event based on the screen edge event and a second touch event comprising a second coordinate that is located in the projection window and that is in the touch slide event.

12. The method of claim 10, wherein the touch slide event comprises a series of touch events, and wherein converting the touch slide event comprises:

generating a touch down event based on a target event, wherein the target event is a $1^{st}$ touch event that is located in the projection window and that is based on the touch slide operation, and wherein the touch down event is a screen edge event of the source projection device; and generating the edge slide event based on the touch down event and a $2^{nd}$ touch event that is located in the projection window and that is in the touch slide event.

13. The method of claim 12, further comprising inserting the touch down event before the target event, and wherein a first coordinate of the touch down event is the same as a second coordinate of the target event.

14. The method of claim 12, wherein generating a touch down event comprises converting the target event into the touch down event.

15. The method of claim 10, further comprising:
identifying that the start touch point is located outside the target area; and
updating screen display content of the destination projection device in response to the touch slide event.

16. The method of claim 10, further comprising:
receiving screen display content that corresponds to the touch slide event from the source projection device; and
displaying the screen display content in the projection window.

17. A terminal device comprising:
a memory configured to store instructions; and
one or more processors coupled to the memory and configured to execute the instructions to cause the terminal device to:
display a projection window of a source projection device;
set a target area formed by extending a preset distance outward from an edge of the projection window;
receive a touch slide operation performed by a user by sliding from outside the projection window to inside the projection window;
generate a touch slide event in response to the touch slide operation; and
when a start touch point of the touch slide operation is located in the target area:
convert the touch slide event into an edge slide event of the source projection device; and
send the edge slide event to the source projection device.

18. The terminal device of claim 17, wherein the touch slide event comprises a series of touch events, and wherein the instructions for converting the touch slide event comprise instructions that, when executed by the one or more processors, cause the terminal device to:
convert a first touch event comprising a first coordinate that is located in the target area and that is in the touch slide event into a screen edge event of the source projection device; and
generate the edge slide event based on the screen edge event and a second touch event comprising a second coordinate that is located in the projection window and that is in the touch slide event.

19. The terminal device of claim 17, wherein the touch slide event comprises a series of touch events, and wherein the instructions for converting the touch slide event comprise instructions that, when executed by the one or more processors, cause the terminal device to:
generate a touch down event based on a target event, wherein the target event is a $1^{st}$ touch event that is located in the projection window and that is based on the touch slide operation, and wherein the touch down event is a screen edge event of the source projection device; and
generate the edge slide event based on the touch down event and a $2^{nd}$ touch event that is located in the projection window and that is in the touch slide event.

20. The terminal device of claim 19, wherein the one or more processors are further configured to execute the instructions to cause the terminal device to:
insert the touch down event before the target event, wherein a first coordinate of the touch down event is the same as a second coordinate of the target event; or
convert the target event into the touch down event.

\* \* \* \* \*